US011859908B2

(12) United States Patent
Richter

(10) Patent No.: US 11,859,908 B2
(45) Date of Patent: Jan. 2, 2024

(54) DEVICES, SYSTEMS AND METHODS FOR EFFLUENT REMOVAL FROM FURNACE PROCESS GAS

(71) Applicant: BTU INTERNATIONAL, INC., No. Billerica, MA (US)

(72) Inventor: Paul J. Richter, Chelmsford, MA (US)

(73) Assignee: BTU INTERNATIONAL, INC., No. Billerica, MA (US)

( * ) Notice: Subject to any disclaimer, the term of this patent is extended or adjusted under 35 U.S.C. 154(b) by 1 day.

(21) Appl. No.: 17/668,706

(22) Filed: Feb. 10, 2022

(65) Prior Publication Data

US 2023/0251037 A1 Aug. 10, 2023

(51) Int. Cl.

*B01D 45/08* (2006.01)
*F27D 17/00* (2006.01)
*F27D 25/00* (2010.01)
*F27D 19/00* (2006.01)

(52) U.S. Cl.

CPC ......... *F27D 17/002* (2013.01); *F27D 25/008* (2013.01); *F27D 2019/0031* (2013.01)

(58) Field of Classification Search

CPC ........... F27D 2019/0031; F27D 17/002; F27D 25/008; F27D 17/00; F27D 17/001; F27D 17/003; F27D 17/008; C10K 1/002; C10L 2290/544; C10J 3/84; C21C 5/38; C21C 5/40; F26B 25/006; F23J 15/02; Y02P 70/10; Y02P 90/84; B01D 47/06; B01D 47/02; B01D 45/08; B23K 37/00

See application file for complete search history.

(56) References Cited

U.S. PATENT DOCUMENTS

| | | | | |
|---|---|---|---|---|
| 5,375,618 | A | 12/1994 | Giannesini | |
| 5,857,715 | A * | 1/1999 | Gray | F16L 55/46 285/284.1 |
| 9,707,505 | B2 * | 7/2017 | Hernandez Olvera | B01D 53/38 |
| 11,202,983 | B2 * | 12/2021 | Richter | B01D 47/06 |
| 2005/0000572 | A1 | 1/2005 | Muller | |
| 2009/0214410 | A1 | 8/2009 | Blanchard et al. | |
| 2009/0294356 | A1 | 12/2009 | Beggs | |
| 2019/0134553 | A1 | 5/2019 | Richter | |

FOREIGN PATENT DOCUMENTS

KR 101828700 B1 * 2/2018

* cited by examiner

*Primary Examiner* — Gregory A Wilson
(74) *Attorney, Agent, or Firm* — PRETI FLAHERTY BELIVEAU & PACHIOS LLP

(57) ABSTRACT

Systems, devices and methods for effluent or flux removal from a gas are disclosed. In one aspect the system includes at least one tube having a body including an interior passageway enabling fluidic flow therethrough; and a plurality of openings disposed along a length of the body in fluidic communication with the interior passageway, thereby enabling withdrawal of the gas laden with the effluent exterior to the at least one tube through the plurality of openings into the interior passageway of the at least one tube.

19 Claims, 24 Drawing Sheets

DEVICES, SYSTEMS AND METHODS FOR EFFLUENT REMOVAL FROM FURNACE PROCESS GAS

STATEMENT REGARDING FEDERALLY SPONSORED RESEARCH OR DEVELOPMENT

Not Applicable

BACKGROUND OF THE INVENTION

The extraction of effluent-laden process gas is an important feature in any conveyor reflow furnace or oven for maintaining a clean process chamber. During reflow processing, effluents including flux, solvents and other cleaning agents are constantly being evolved from circuit boards and introduced into the process chamber of the furnace. The effluents can include sticky resins which deposit on surfaces within the furnace. The buildup of such resins can negatively affect heat transfer, mechanical components, sensors and can drip onto product causing yield loss. Clean-up of effluent deposits is laborious and requires significant machine down time.

Build-up of flux effluent in reflow furnaces is generally controlled by removing a portion of the process gas and delivering it to a flux management system for separation of the flux waste before recycling the cleaned process gas back to the furnace. Improvement of the efficiency of flux extraction from the furnace is beneficial because as more flux is removed from the furnace and processed by the flux management system, the furnace chamber will remain at an acceptable cleanliness state longer, thus extending the interval between costly furnace shutdowns and cleanings.

Prior art methods for flux extraction include drawing furnace process gas from the process blower heating and cooling plenums and then directing drawn furnace process gas to the flux management system. Such methods have several deficiencies:

The flux laden gas travels a significant distance from the point where it is evolved from the circuit board to the point where it is drawn off in the plenum. During this significant travel distance, there are numerous opportunities for the effluent residue to adhere to surfaces within the furnace.

Large volumes of process gas containing sticky residues which are allowed to flow within the process blower plenums can result in deposition on the blower wheels causing mechanical imbalance and changes to flow properties. The residues can also block, or partially block holes in the perforated discharge plates. The deposition of residues on electric radiant heating elements can damage the elements and reduce time-between-failures. The drawing of gas from the plenums can upset the balance of flow within the plenum and alter performance.

Thus, there is a need to improve the extraction of effluent laden process gas streams from furnaces such as conveyor reflow furnaces in the manufacture of products such as circuit boards.

BRIEF SUMMARY OF THE INVENTION

The present invention addresses the deficiencies of known effluent or flux extraction systems, devices and methods thereby providing efficient and superior systems, devices and methods for gas stream effluent and/or flux removal from reflow and/or other furnaces.

In one aspect, the invention features a system for withdrawal of a gas laden with an effluent, the system comprising: at least one tube having a body including an interior passageway enabling fluidic flow therethrough; and a plurality of openings disposed along a length of the body in fluidic communication with the interior passageway, thereby enabling withdrawal of the gas laden with the effluent exterior to the at least one tube through the plurality of openings into the interior passageway of the at least one tube.

In one non-limiting embodiment, the system includes at least one trunkline in fluidic communication with the at least one tube via a connection device enabling withdrawal of the gas laden with the effluent from the at least one tube into the at least one trunkline.

In another non-limiting embodiment, the system includes the at least one tube and an at least first portion of the at least one trunkline is disposed within at least one heating zone of a process chamber of a furnace.

In another non-limiting embodiment, the system includes the at least first portion of the at least one trunkline has a length corresponding to a percentage of the length of the process chamber in a range of 20% to 100%.

In another non-limiting embodiment, the system includes a material capable of withstanding a temperature above a condensation temperature of the effluent.

In another non-limiting embodiment, the connection device includes a reversible coupling for selectively opening and closing fluidic flow from the at least one tube to the at least one trunkline.

In another non-limiting embodiment, the connection device includes a reversible coupling for selectively connecting and detaching the at least one tube respectively to and from the at least one trunkline.

In another non-limiting embodiment, the at least one trunkline includes at least one valve for controlling an amount of the gas laden with the effluent withdrawn through the connection device into the at least one trunkline.

In another non-limiting embodiment, the at least one valve is selected from the group consisting of a manual valve, an automated valve, an adjustable valve, a non-adjustable valve, a throttle valve, and a fixed orifice plate.

In another non-limiting embodiment, a body of the at least one trunkline includes at least one first segment having a first length having a first inside diameter and at least one second segment having a second length having a second inside diameter; and wherein the first length and the first inside diameter and the second length and the second inside diameter are selected for biasing a flow of the gas laden with the effluent through the at least one trunkline.

In another non-limiting embodiment, the at least one trunkline includes a first extraction port fluidically connected to a first at least one tube via the connection device comprising a first connection device; wherein the at least one trunkline includes a second extraction port fluidically connected to a second at least one tube via the connection device comprising a second connection device; wherein the first extraction port has a first internal cross-sectional flow through area and the second extraction port has a second internal cross-sectional flow through area; and wherein the first internal cross-sectional flow through area and the second internal cross-sectional flow through area are selected for biasing the flow of the gas laden with the effluent through the at least one trunkline.

In another non-limiting embodiment, each of the plurality of openings of the at least one tube has a cross-sectional flow through area selected for providing appropriate resistance for biasing a flow of the gas laden with the effluent through the at least one tube.

In another non-limiting embodiment, at least one of the plurality of openings of the at least one tube includes an adjustable device for selectively adjusting a flow of the gas laden with the effluent through the adjustable device for biasing a flow of the gas laden with the effluent through the at least one tube.

In another non-limiting embodiment, the adjustable device is selected from the group consisting of an adjustable damper and an adjustable shutter.

In another non-limiting embodiment, the at least one tube has a tube port for mating with an at least one extraction port disposed on the at least one trunkline via the connection device thereby enabling fluidic flow from the at least one tube into the at least one trunkline; and wherein the tube port is disposed in a location on the body of the at least one tube for biasing a flow of the gas laden with the effluent through the at least one tube.

In another non-limiting embodiment, the at least one tube includes a material capable of withstanding a temperature in a range of 20° C. to 400° C.; and wherein the material selected from the group consisting of aluminum, steel, stainless steel, Inconel®, austenitic nickel-chromium-based superalloy, high-temperature rated plastic, and a combination of two or more of the aforementioned.

In another non-limiting embodiment, the at least one trunkline includes a material capable of withstanding a temperature in a range of 20° C. to 400° C.; and wherein the material is selected from the group consisting of aluminum, steel, stainless steel, Inconel®, austenitic nickel-chromium-based superalloy, high-temperature rated plastic, and a combination of two or more of the aforementioned.

In another non-limiting embodiment, the at least one tube is disposed within a process chamber of a furnace; and wherein the at least one tube has a length corresponding to a percentage of a width of the process chamber in a range of 5% to 100%.

In another non-limiting embodiment, the at least one tube has a sealed end.

In another aspect, the invention features a method of withdrawing a gas laden with an effluent from a process chamber of a furnace including providing in one or more heating zones in the process chamber of the furnace at least one tube having a plurality of openings; conveying a product into and through the one or more heating zones in the process chamber of the furnace; heating the product in the one or more heating zones thereby vaporizing an effluent into the gas of the process chamber; withdrawing the gas laden with the effluent through the plurality of openings into the at least one tube; withdrawing the gas laden with the effluent from the at least one tube into an at least one trunkline fluidically connected to the at least one tube; and passing the gas through the at least one trunkline through an exit of the furnace.

DETAILED DESCRIPTION OF THE INVENTION

Figure 1:
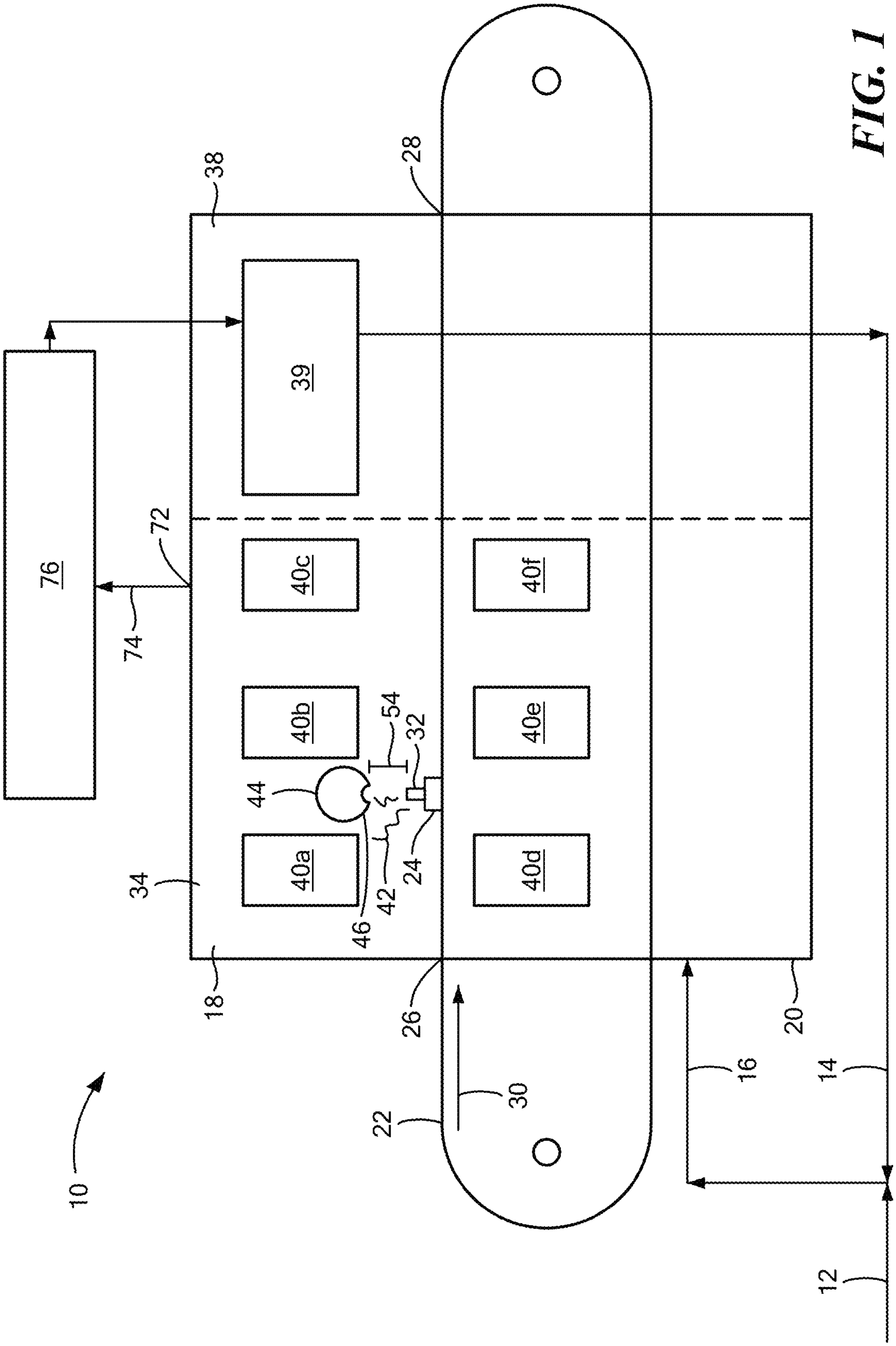
FIG. 1 is a diagrammatic view of an effluent removal system according to a non-limiting embodiment of the invention.

In one aspect, the invention features an effluent removal system 10 as illustrated in FIG. 1. Input gas 12 is combined with recycled cleaned or scrubbed process gas 14 into process gas input stream 16 which is introduced into a process chamber 18 of a furnace 20. In other non-limiting embodiments, the process gas stream can include only non-recycled input gas or only recycled process gas. includes only recycles process gas. In non-limiting embodiments the furnace 20 is an oven, a reflow furnace or oven, or other type of furnace or oven. A product conveyor 22 is used to convey or to pass one or product(s) 24 into the process chamber 18 from the entrance 26 to the exit 28 of the furnace 20 as shown by directional arrow 30. Each of the one or more product(s) 24 can include one or more component(s) 32. In one non-limiting embodiment, the product conveyor 22 is a conveyor belt. In other non-limiting embodiment(s), the one or more product(s) 24 being conveyed or passed through the furnace 20 include one or more circuit boards each having one or more components.

The furnace 20 includes the process chamber 18 having one or more heating zone(s) or region(s) 34 and a cooling section 38 having one or more cooling zone(s) or region(s) 39. Each heating region 34 is equipped with one or more heating element(s) 40, as shown by heating elements 40*a-f* in the non-limiting embodiment of FIG. 1. Although FIG. 1 is shown with one heating zone 34 and one cooling zone 39, the furnace 20 can include the process chamber 18 having more than one heating zone 34 and the cooling section 38 having more than one cooling zone or region 39. The heating zones 34 and the cooling zones 38 are linearly disposed in the furnace 20 such that the product conveyor 22 passes from furnace entrance 26 into the process chamber 18, consecutively through the one or more heating zones 34, and subsequently consecutively through the cooling section 38 having one or more cooling zones or regions 39 before exiting the furnace 20 at the furnace exit 28. In other non-limiting embodiments, the cooling section 38 is disposed outside the walls, frame, or housing of the furnace 20.

In a non-limiting embodiment, FIG. 1 shows heating elements 40*a-c* positioned vertically above the product conveyor 22 and heating elements 40*d-f* positioned vertically below the product conveyor 22. In other non-limiting embodiments, the one or more heating elements(s) 40 can be positioned at various angles with respect to product conveyor 22, and the one or more product(s) 24, including the one or more components 32.

During processing, the heating elements(s) 40(*a-f*) provide heat to the products 24 including components 32.

The heating of the one or more products 24, and the one or more components 32 of each of the products 24 cause the emission, evolution, or vaporization of an effluent 42 into the process gas 16 of the furnace 20. In non-limiting embodiments, the effluent 42 can include several constituents such as, for non-limiting examples, flux, solvent, resins such as sticky resins, and/or other effluents which are vaporized from the product(s) 24 during heating and introduced into the atmosphere of the process chamber 18. Different effluent constituents can be evolved or vaporized at different heating conditions including different temperatures.

Figure 2:
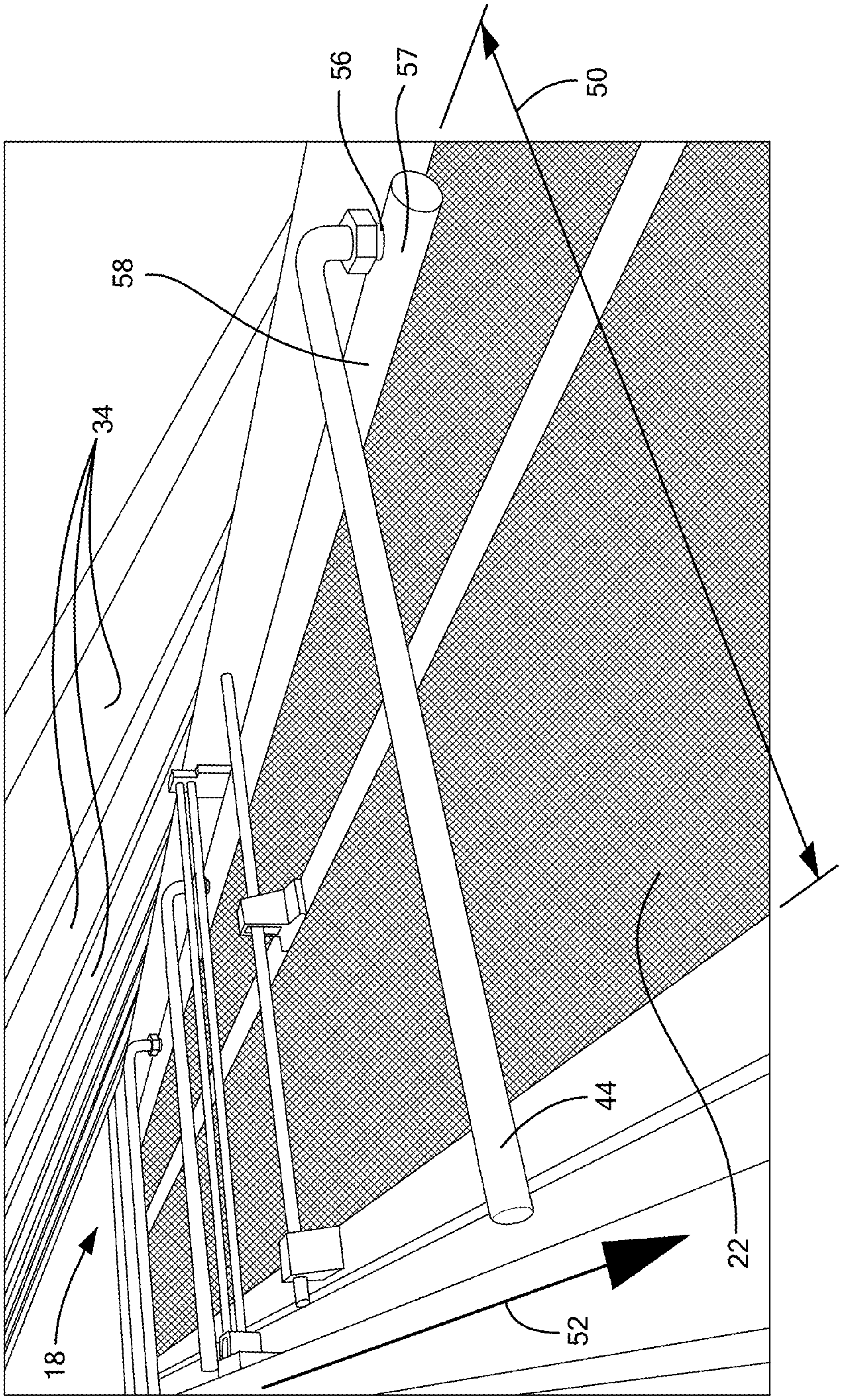
FIG. 2 is a view of an effluent removal system according to a non-limiting embodiment of the invention.
Figure 3:
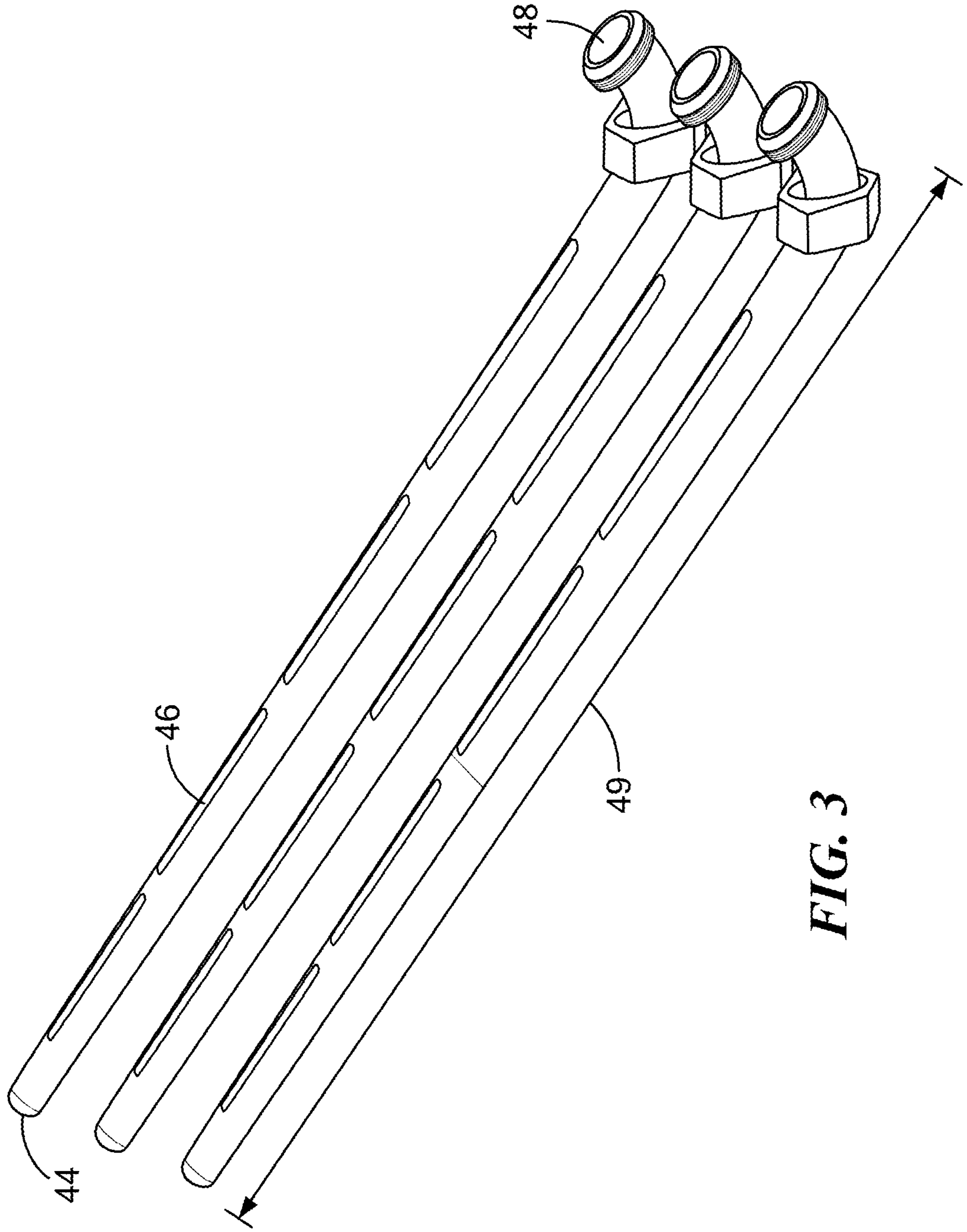
FIG. 3 is a view of extraction tubes according to a non-limiting embodiment of the invention.
Figure 4:
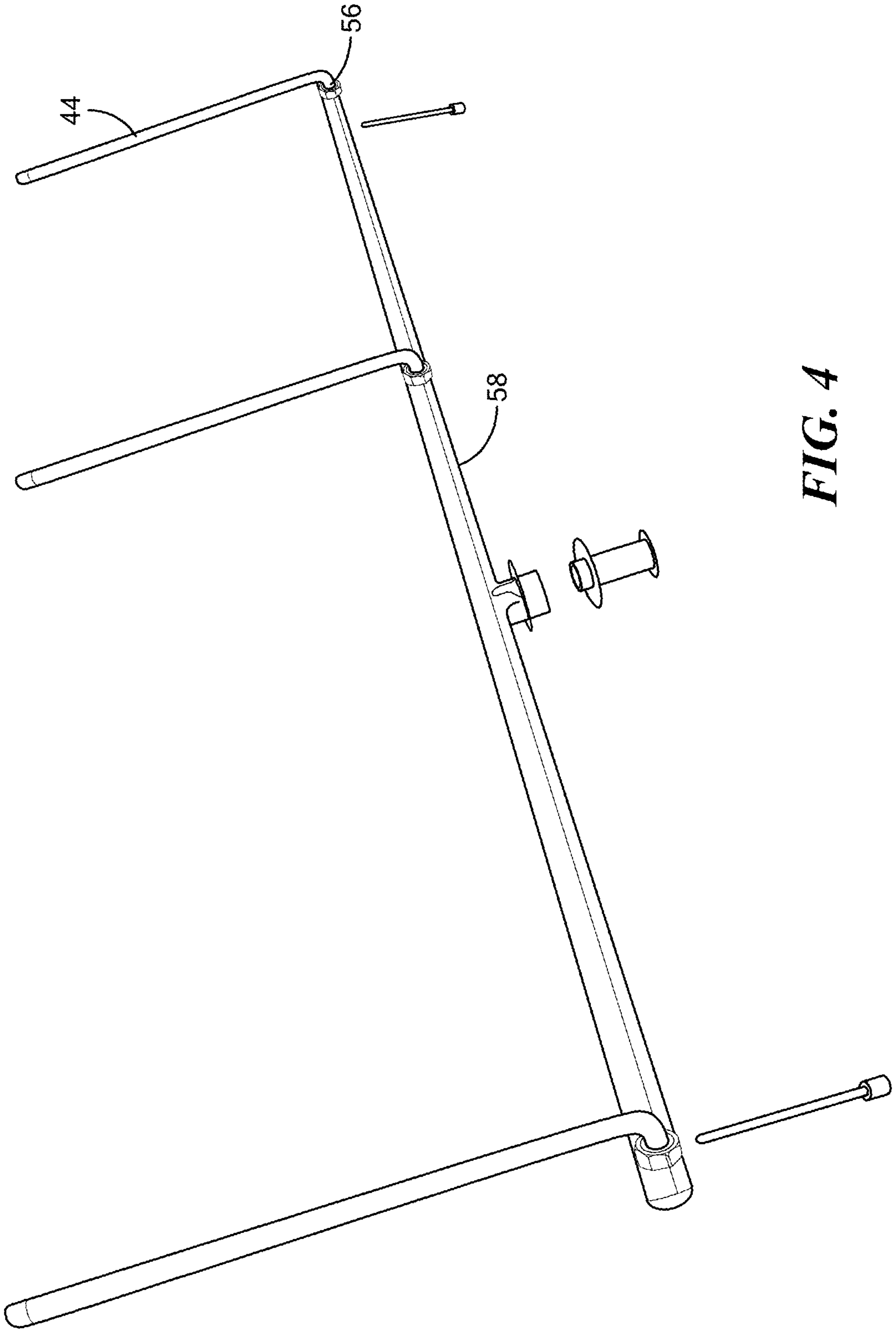
FIG. 4 is a view of an extraction trunkline according to a non-limiting embodiment of the invention.

FIGS. 1, 2, 3 and/or 4 show the invention featuring one or more effluent extraction tube(s) 44 each having one or more slots 46 or openings which are positioned above the product conveyor 22. Each tube 44 preferably has length 49 which spans the width 50 of the process chamber. Preferably each tube 44 is disposed above and perpendicular to the travelling path 52 of the product conveyor 22 on which the product(s) 24 are conveyed through the furnace 20. In other embodiments, the length 49 of each tube 44 is disposed in a direction other than perpendicular to the travelling path 52 of the product conveyor 22 through the furnace 20. Each tube 44 is preferably disposed at a selected height or height range 54 above the product(s) 24 including component(s) 32 being passed through the furnace 20 in an area corresponding to a heavy release of effluent 42, at a specific temperature on a thermal profile. The slots 46 of the tubes 44 can be preferably disposed to generally correspond to the product(s) 24 or product component(s) 32 passing through the furnace beneath the tubes 44. Thus, each tube 44 and more particularly the slots 46 of each tube 44 can be selectively disposed to be as proximate to the point of generation of effluent 42. The slots 46 of each tube 44 can be oriented towards the generation of effluent.

Each tube 44 is fluidically connected to one or more trunklines. Preferably each tube 44 is fluidically to a common trunkline or manifold 58 via a tube port 48 and corresponding trunkline extraction port 56 disposed on the common trunkline or manifold 58, as shown in FIGS. 2, and/or FIGS. 5-6. The trunkline 58 can be located inside or outside the process chamber 18 of the furnace 20. Preferably, at least a first portion or segment of the trunkline 57 is disposed within the process chamber 18. Thus, the temperature of the process chamber 18 heating zones 34 can maintain the process gas 16 laden with effluent 42 in a gaseous state and can minimize condensation of effluent prior to subsequent delivery to an effluent management system. FIG. 2 shows a first portion 57 of the trunkline 58 disposed in the heating region 34 of the process chamber 18 until the first portion of the trunkline exits the furnace 20 at a trunkline exit port shown as exit port 72 in FIG. 1 on a case of the furnace. This configuration minimizes or eliminates condensation and deposition of the effluent 42 within the tubes 44 and the trunkline 58.

Figure 5:
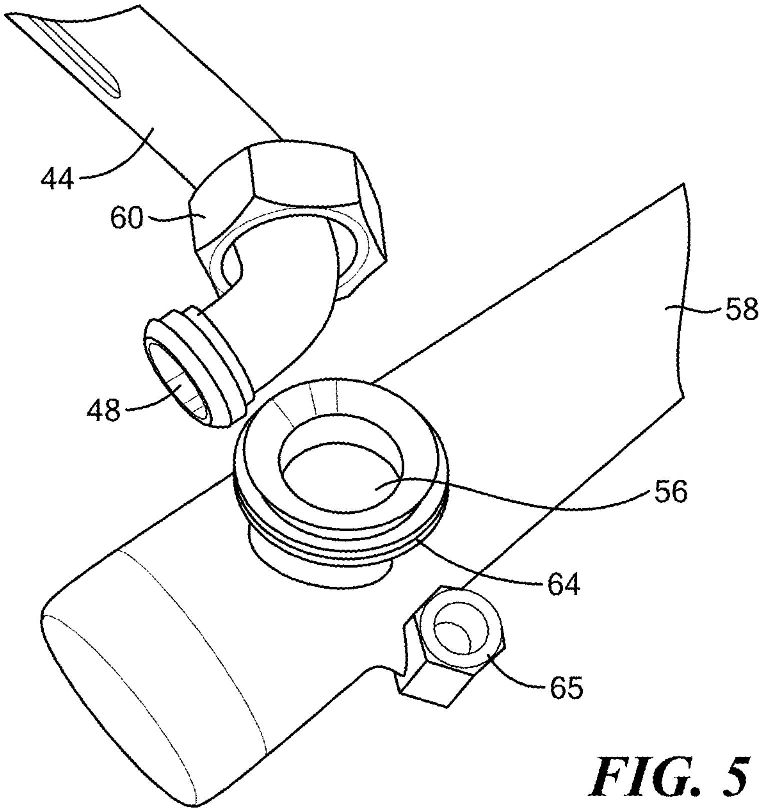
FIG. 5 is a diagrammatic view of connection device according to a non-limiting embodiment of the invention.
Figure 6:
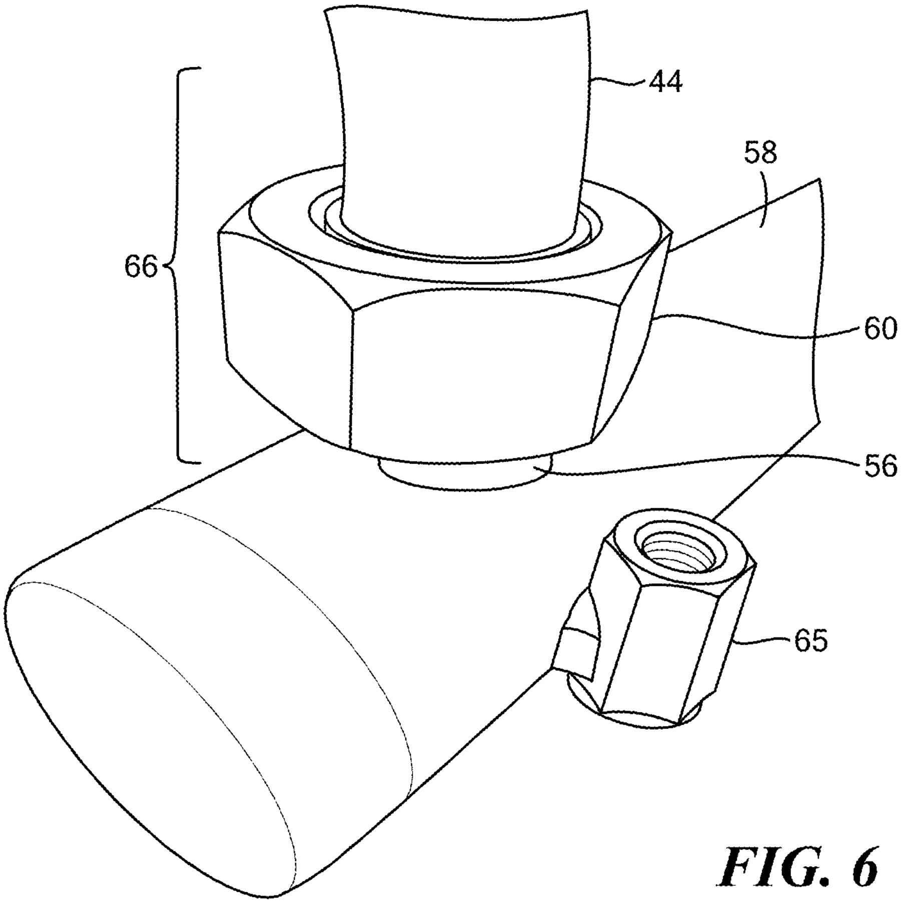
FIG. 6 is a diagrammatic view of a connection device according to a non-limiting embodiment of the invention.

The one or more tube(s) 44 are fluidically connected to one or more trunklines 58 via a connection device, shown in a non-limiting embodiment as connection device 66 in FIG. 6. In a non-limiting embodiment shown in FIGS. 5 and 6, the connection device includes an internally threaded female connection coupling 60 on a tube 44 which can mate with a corresponding externally threaded connection coupling 64 on the trunkline 58. The connection device 66 enables the tube 44 to have selective and reversible fluidic connection to or detachment from the corresponding extraction tube port 56 on the trunkline 58. The trunkline also includes a threaded weld nut 65, as shown in FIGS. 5 and 6, on each end of the trunkline. A threaded rod is screwed into the corresponding weld nut 65 on each end of the trunkline 58. Each threaded rod is adjusted for contact with the bottom of the process chamber of the oven for leveling and stabilization of the trunkline.

In addition, or in the alternative, either the tube 44 or the trunkline 58 includes a mechanism, such as, for a non-limiting example, a valve, which can be used to reversibly seal or release fluidic flow from the tube or into the trunkline without having to remove the tube 44 from the trunkline 58.

In preferred embodiments, various features of the tubes 44 and/or the trunkline 58 can be used to influence the general flow of process gas 16 within the furnace 18. The general flow of process gas in the furnace can be influenced by biasing, adjusting, or altering longitudinal flow extracted through the trunkline extraction ports 56 and the volumetric flow passing through the trunkline 58, and/or by biasing, adjusting, or altering the lateral flow along the length of one or more individual extraction tube(s) 44. Gas flow in specific regions of the furnace can thus be increased or decreased to achieve a selected or desired balanced flow condition. The improvement of the gas flow balance within a convection furnace provides better thermal uniformity. In addition, gas usage can be reduced thereby reducing operational costs particularly in systems which employ an inert process or cover gas. Typical process gases for reflow furnaces include nitrogen or air as non-limiting examples.

Figure 7A:
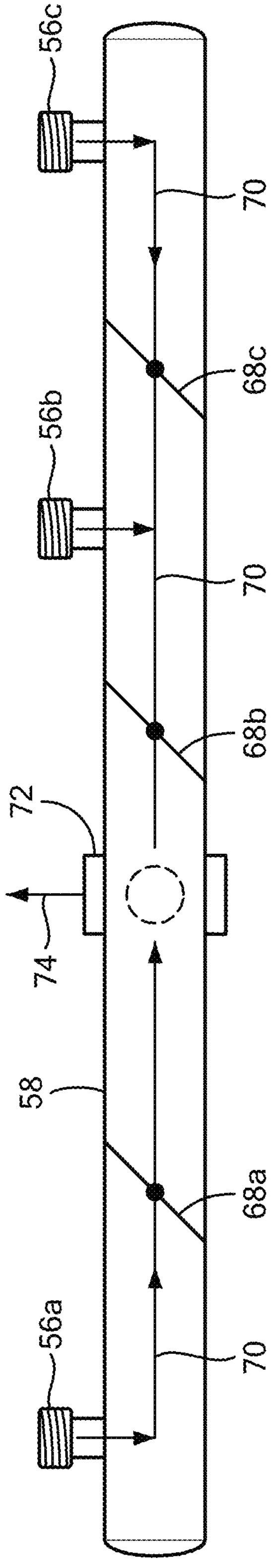
FIG. 7A is a diagrammatic view of an effluent removal system for longitudinal flow biasing of process gas according to a non-limiting embodiment of the invention.

For example, regarding longitudinal flow biasing, in a non-limiting embodiment of the invention, one or more valve(s) 68 can be provided in the trunkline 58, as shown by valves 68*a*, 68*b*, and 68*c* in the non-limiting embodiment of FIG. 7A. Each valve 68 can be disposed downstream of a respective extraction port 56 of the trunkline 58, as shown by valves 68*a*, 68*b*, and 68*c* down stream of respective extraction ports 56*a*, 56*b*, and 56*c* in FIG. 7A. The respective valve 68 can be used to bias, adjust, or alter the volume of effluent laden process gas 70 extracted through the extraction port 56 and passing through the trunkline 58 prior to the effluent laden process gas 70 passing through the trunkline exit port 72 and along the effluent management feed line 74 to the effluent management system 76, as shown in FIG. 1.

In non-limiting embodiments, the longitudinal flow can be reversibly or non-reversibly biased. For example, regarding reversible biasing of longitudinal flow, one or more valve(s) 68 including a manual or an automated adjustable valve, such as, for a non-limiting example, a throttle valve, can be used to bias, adjust, or alter reversibly the volume of effluent laden process gas 70 extracted through each extraction port 56 and thus passing through the trunkline 58.

Figure 7B:
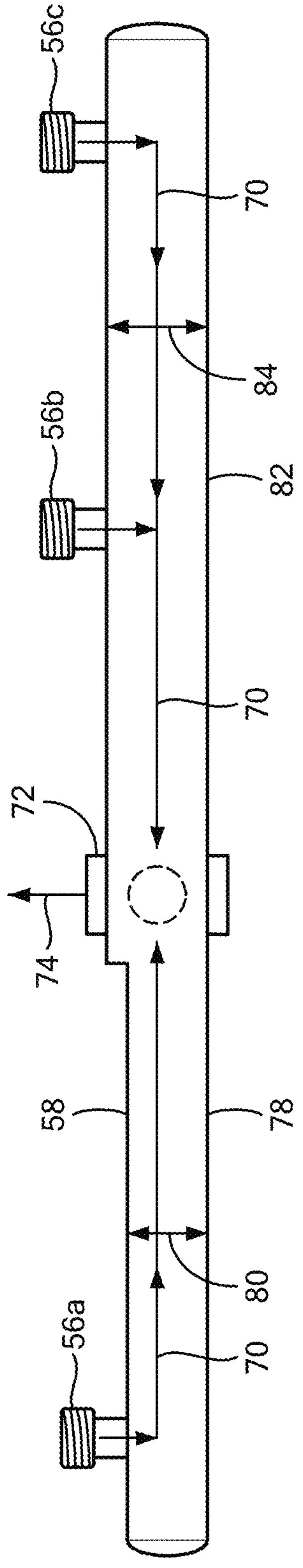
FIG. 7B is a diagrammatic view of an effluent removal system for longitudinal flow biasing of process gas according to a non-limiting embodiment of the invention.

Regarding non-reversible biasing of longitudinal flow, in lieu of a manual or an automated adjustable valve, one or more valve(s) 68 can include a fixed valve, such as, for a non-limiting example, an orifice plate, which can be used to bias, alter, or adjust non-reversibly the volume of effluent laden process gas 70 withdrawn through each extraction port 56 and thus passing through the trunkline 58. In addition to or in lieu of any such one or more fixed valve(s) 68, the inner diameter of one or more segment(s) or portion(s) of the trunkline 58 can be varied for selected non-reversible biasing of longitudinal flow of effluent laden process gas 70, as shown by the non-limiting embodiment of FIG. 7B. In FIG. 7B, a segment or portion 78 of the trunkline 58 has an inner diameter 80 which is less than the inner diameter 84 of the segment or portion 82 of trunkline 58. Thus, the selected difference or variation in internal cross section area of the trunkline 58 can be used to selectively bias the flow of effluent laden process gas 70 withdrawn into the extraction ports 56 and through the trunkline 58. In addition to or in lieu of such one or more fixed valve(s) 68, and the selected variation of the inner diameter of one or more segment(s) or portion(s) of the trunkline 58, selected variation of the cross-sectional area of one or more extraction port(s) 56 can also provide non-reversible biasing of the effluent laden process gas 70 extracted through an extraction port 56 and thus passing through trunkline 58.

Figures 8A, 8B, 8C:
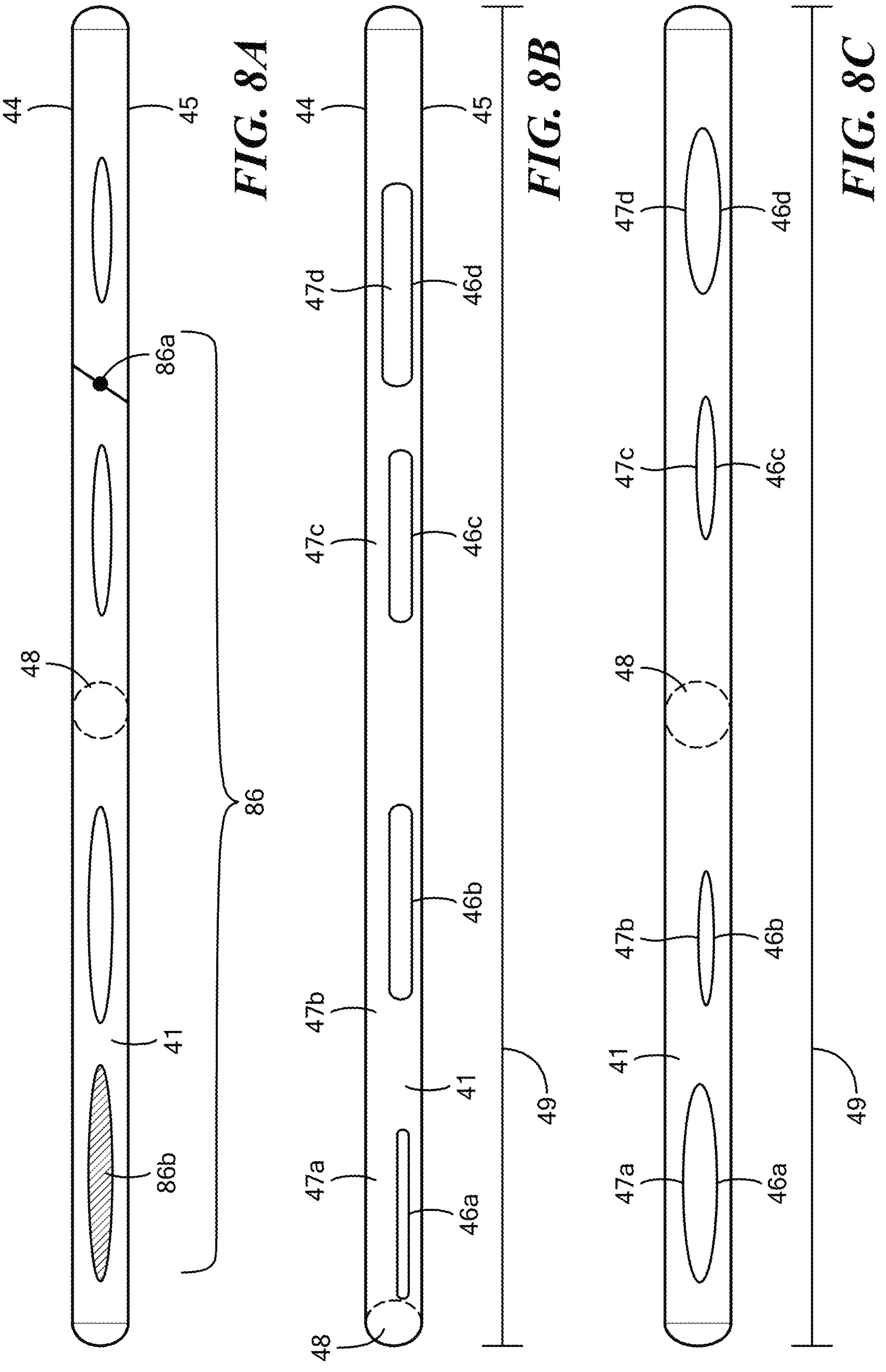
FIG. 8A is a diagrammatic view of an effluent removal system for lateral flow biasing of process gas according to a non-limiting embodiment of the invention.
FIG. 8B is a diagrammatic view of an effluent removal system for lateral flow biasing of process gas according to a non-limiting embodiment of the invention
FIG. 8C is a diagrammatic view of an effluent removal system for lateral flow biasing of process gas according to a non-limiting embodiment of the invention.

Lateral flow through the interior passageway 41 along the length 49 of one or more individual tube(s) 44 can also be reversibly or non-reversibly biased, altered or adjusted, as shown in FIGS. 8A, 8B and/or 8C. For example, regarding reversible biasing of lateral flow, one or more individual tube(s) 44 can be provided with one or more lateral flow adjusting devices, 86. The one or more lateral flow adjusting device(s) 86 can include, for non-limiting examples, one or more adjustable damping devices or dampers disposed in the body 45 of one or more individual tube(s) 44, as shown by adjustable damper 86*a* in the non-limiting embodiment of FIG. 8A. Alternatively, or in addition to such one or more adjustable dampers, the lateral flow adjusting device 86 can include, for non-limiting examples, one or more adjustable shutter(s) where each adjustable shutter corresponds to and is adapted for a corresponding slot 46 on an individual tube 44, as shown by the adjustable shutter 86*b* shown in the non-limiting embodiment of FIG. 8A. The adjustable shutters can be selectively adjusted thereby altering the cross-sectional area of the related slot 46 and thus the flow of gas therethrough and through the interior passageway 41 of the tube 44.

Regarding non-reversible biasing of lateral flow, each of one or more of slot(s) 46 can be selectively sized for a cross-sectional flow through area for achieving a desired flow bias through the interior passageway 41 along the length 49 of the corresponding tube 44. In the non-limiting embodiments of FIGS. 8B and 8C, each of four slots 46*a*, 46*b*, 46*c* and 46*d* correspond to a respective cross-sectional flow-through area 47*a*, 47*b*, 47*c*, 47*d*, where each area and/or the combination of areas is selected for a desired lateral flow bias through the interior passageway 41 along a length 49 of the respective individual tube 44. In addition, or in lieu of the selectively sized cross-sectional flow through areas 47 of slots 46 described above, the location for the tube port 48 through which gas passes from the tube 44 through the corresponding trunkline extraction port 56 into the trunkline 58 can be selected based on a desired biasing of lateral flow through the interior passageway 41 along the length 49 of the individual tube 44. For example, in the non-limiting embodiment of FIG. 8B, the tube port 48 is disposed at an end of the body 45 of the tube 44 in comparison with the tube port 48 disposed in a center of the body 45 of the tube 44 in the non-limiting embodiment of FIG. 8C. The progression and/or inter-relationship of cross-sectional flow through areas of the openings 46 can also be selected for flow biasing. In the non-limiting embodiment shown in in FIG. 8B, cross-sectional flow through areas of 47*d*, 47*c*, 47*b*, and 47*a* progressively decrease with the smallest cross-sectional flow through area 47*a* disposed proximate to the tube port disposed at one end of the tube. In the non-limiting embodiment of FIG. 8C, cross-sectional flow through areas 47*a* and 47*d* decrease in comparison with respective adjacent cross-sectional flow through areas 47*b* and 47*d* which are disposed proximate to the tube port disposed in the middle of the tube.

In addition, the extraction tubes 44 or branches can be selectively positioned along the length of the trunkline 58 to adapt to specific unique and/or desired thermal profiles and materials sets including variables such as, for non-limiting examples, solder paste, circuit board type, size and component load. In one non-limiting embodiment, the trunkline can be equipped with a linear array of connection couplings, such as, for a non-limiting example, the connection coupling 64 shown in FIG. 5. Extraction tubes 44 or branches can be selectively attached to a corresponding coupling using, for a non-limiting example, the connection coupling 60 shown in FIGS. 5 and 6, as needed for a particular thermal profile. An unused coupling, that is, a coupling not attached to an extraction tube 44 can be sealed with a cap. The cap can include a reversible or non-reversible sealing mechanism. Preferred embodiments include reversible sealing caps. The linear array of trunkline connection couplings can be disposed within or between every heating zone for maximum flexibility, or within or between every other heating zone for reasonable flexibility. In a preferred embodiment, each trunkline connection coupling and corresponding extraction tube 44 or branch is disposed in a space between respective heating zones. Such a configuration enables placement of the extraction tube 44 flush with the heater diffuser plate. In addition, placement of the extraction tube 44 between respective heating zones provides the least impact on zone heater convection flow.

The material; placement, configuration, and/or disposition; and dimensions of the extraction tubes 44 are selected based upon the type of processing, the related heating conditions and/or for optimization of flow efficiencies. The extraction tubes 44 include a material which can withstand the high temperatures of the heating zones of the furnace. The material of the tubes is selected from the group consisting of aluminum, steel, stainless steel, Inconel®, austenitic nickel-chromium-based superalloy, high-temperature rated plastic, and a combination of two or more of the aforementioned. For purposes of this application, a high-temperature rated plastic includes a plastic which can withstand temperatures in a range of 20° C. to 400° C., and preferably in a range of 100° C. to 380° C., more preferably in a range of 200° C. to 375° C., and most preferably in a range of 300° C. to 350° C.

The extraction tubes 44 can be disposed from the face of the extraction port 56 on the extraction trunkline 58 above the pass line of the product conveyor 22 at a height in range of 0.5 inches to 5.5 inches, preferably in a range of 1.0 inches to 4.0 inches, more preferably in a range of 1.25 inches to 3.0 inches, and most preferably in a range of 1.5 inches to 2.0 inches above the product conveyor 22 being passed through the furnace 20.

Each of the extraction tubes 44 spans at least in part or wholly the width of the product conveyor. Each of the extraction tubes 44 has a length corresponding to a percentage of the width of the process chamber including the heating zones in a range of 75% to 100%, preferably in a range of 80% to 100%, more preferably in a range of 90% to 100%, and most preferably in a range of 98% to 100%.

The inner diameter of the extraction tubes 44 is in a range of 0.5 inch to 3 inches, preferably in a range of 0.6 inches to 2.5 inches, more preferably in a range of 0.7 inches to 2 inches, and most preferably in a range of 0.8 inches to 1.5 inches. The openings or slots of each tube have a cross sectional area in a range of 0.2 $in^2$ to 7.1 $in^2$, preferably in a range of 0.28 $in^2$ to 4.9 $in^2$, more preferably in a range of 0.38 $in^2$ to 3.1 $in^2$, and most preferably in a range of 0.5 $in^2$ to 1.8 $in^2$. The outer diameter of the extraction tubes 44 is in a range of 0.75 inches to 3.25 inches, preferably in a range of 0.9 inches to 2.75 inches, more preferably in a range of 1.0 inches to 2.25 inches, and most preferably in a range of 0.75 inches to 1.75 inches.

Similarly, the material; placement, configuration, and/or disposition; and dimensions of the trunklines 58 are selected based upon the type of processing, the related heating conditions and/or for optimization of flow efficiencies. The material of the extraction trunkline 58 is selected from the group consisting of aluminum, steel, stainless steel, Inconel®, austenitic nickel-chromium-based superalloy, high-temperature rated plastic, and a combination of two or more of the aforementioned.

The extraction trunkline 58 can have at least a first portion for disposition within the process chamber and having a length corresponding to a percentage of the length of the process chamber including the heating zones in a range of 20% to 100%, preferably in a range of 50% to 100%, more preferably in a range of 75% to 100% and most preferably in a range of 80% to 100%.

The inner diameter of the extraction trunkline 58 is in a range of 1.5 inches to 3 inches, preferably in a range of 1.75 inches to 2.75 inches, more preferably in a range of 1.85 inches to 2.5 inches, and most preferably in a range of 2.0 inches to 2.25 inches. The trunkline 58 has a cross sectional area in a range of 1.77 $in^2$ to 7.0 $in^2$, preferably in a range of 2.4 $in^2$ to 5.9 $in^2$, and more preferably in a range of 2.69 $in^2$ to 4.9 $in^2$, and most preferably in a range of 3.1 $in^2$ to 3.9 $in^2$. The outer diameter of the extraction trunkline 58 is in a range of 1.75 inches to 3.25 inches, preferably in a range of 2 inches to 3 inches, more preferably in a range of 2 inches to 2.75 inches, and most preferably in a range of 2.25 inches to 2.5 inches.

Figure 9A:
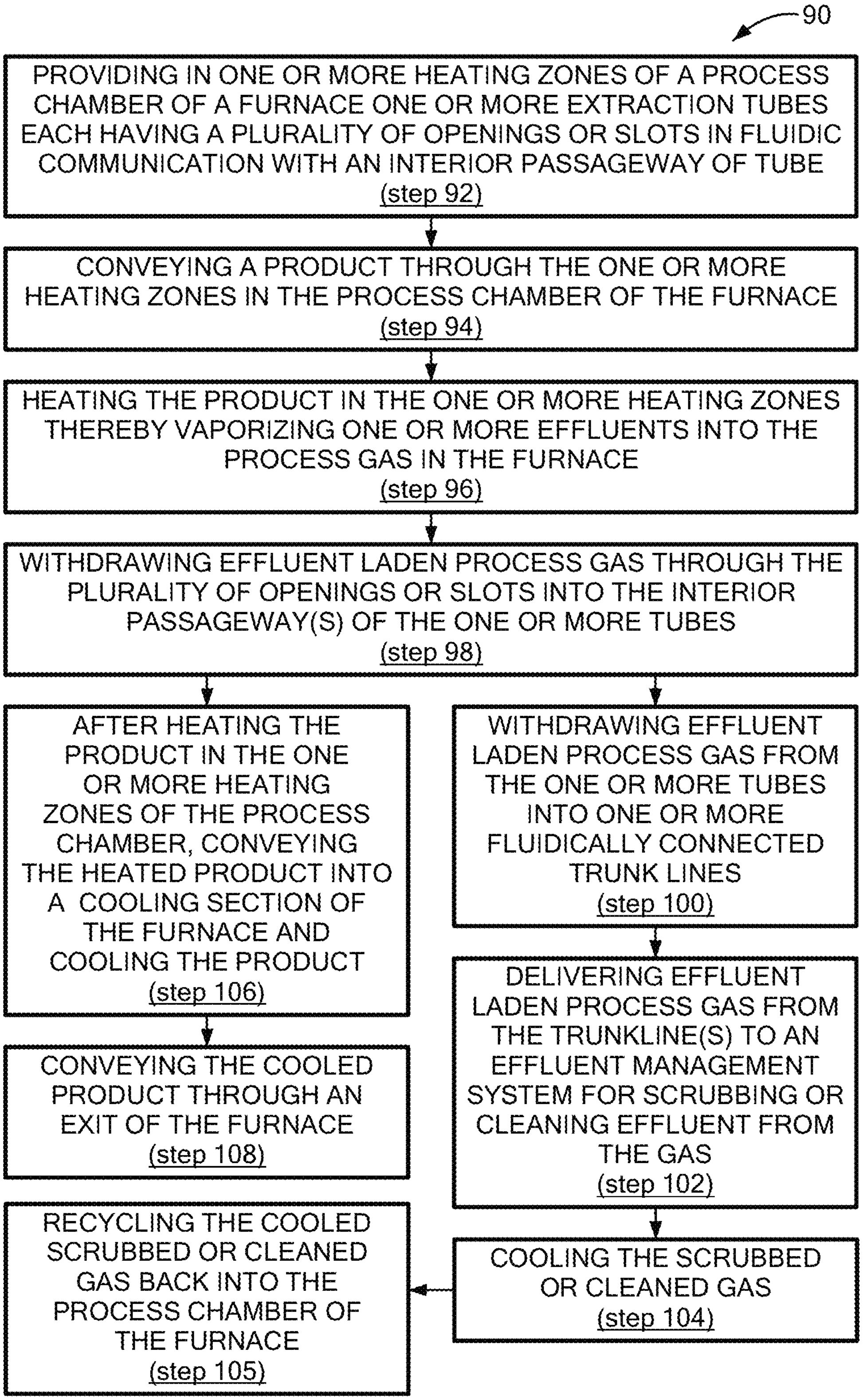
FIG. 9A is a flow chart which illustrates the steps of the method according to a non-limiting embodiment of the invention.

In another aspect, the invention features a method for removal of an effluent, such as a flux, from a gas stream. Steps of the method 90 are shown in the flow chart illustrated in FIG. 9A according to one non-limiting embodiment. The method includes providing in one or more heating zones of a process chamber of a furnace one or more extraction tubes each having a plurality of openings or slots in fluidic communication with an interior passageway, as illustrated by step 92; conveying a product through the one or more heating zones of the process chamber of the furnace, as illustrated by step 94; heating the product in the one or more heating zones thereby vaporizing one or more effluents into a process gas in the furnace, as illustrated by step 96; withdrawing the effluent laden process gas through the plurality of openings or slots into the interior passageway(s) of the one or more tubes, as illustrated by step 98; withdrawing the effluent laden process gas from one or more tubes into one or more fluidically connected trunklines, as illustrated by step 100. In other non-limiting embodiments, the method includes delivering the effluent laden process gas from the one or more trunklines to an effluent management system for scrubbing or cleaning effluent from the gas, as illustrated by step 102; cooling the scrubbed or cleaned gas, as illustrated by step 104; and recycling the scrubbed or cleaned gas back into the process chamber of the furnace in step 105. In non-limiting embodiments, the cleaned process gas is cooled either in a cooling section of the furnace or in a cooler exterior to the furnace prior to recycling the process gas back into the process chamber. In non-limiting embodiments, after heating the product in the one or more heating zones of the process chamber, the method includes conveying the heated product into a cooling section of the furnace and cooling the product, as illustrated by step 106; and conveying the product through an exit of the furnace, as illustrated by step 108.

In other non-limiting embodiments of the invention, the method of the invention can include conveying the product consecutively through the one or more heating zones where the product is heated at selected increasing temperatures in each consecutive heating zone for vaporization of targeted constituents of the effluent. Preferable, the method provide a common trunkline fluidically connected to the one or more extraction tubes.

Figure 9B:
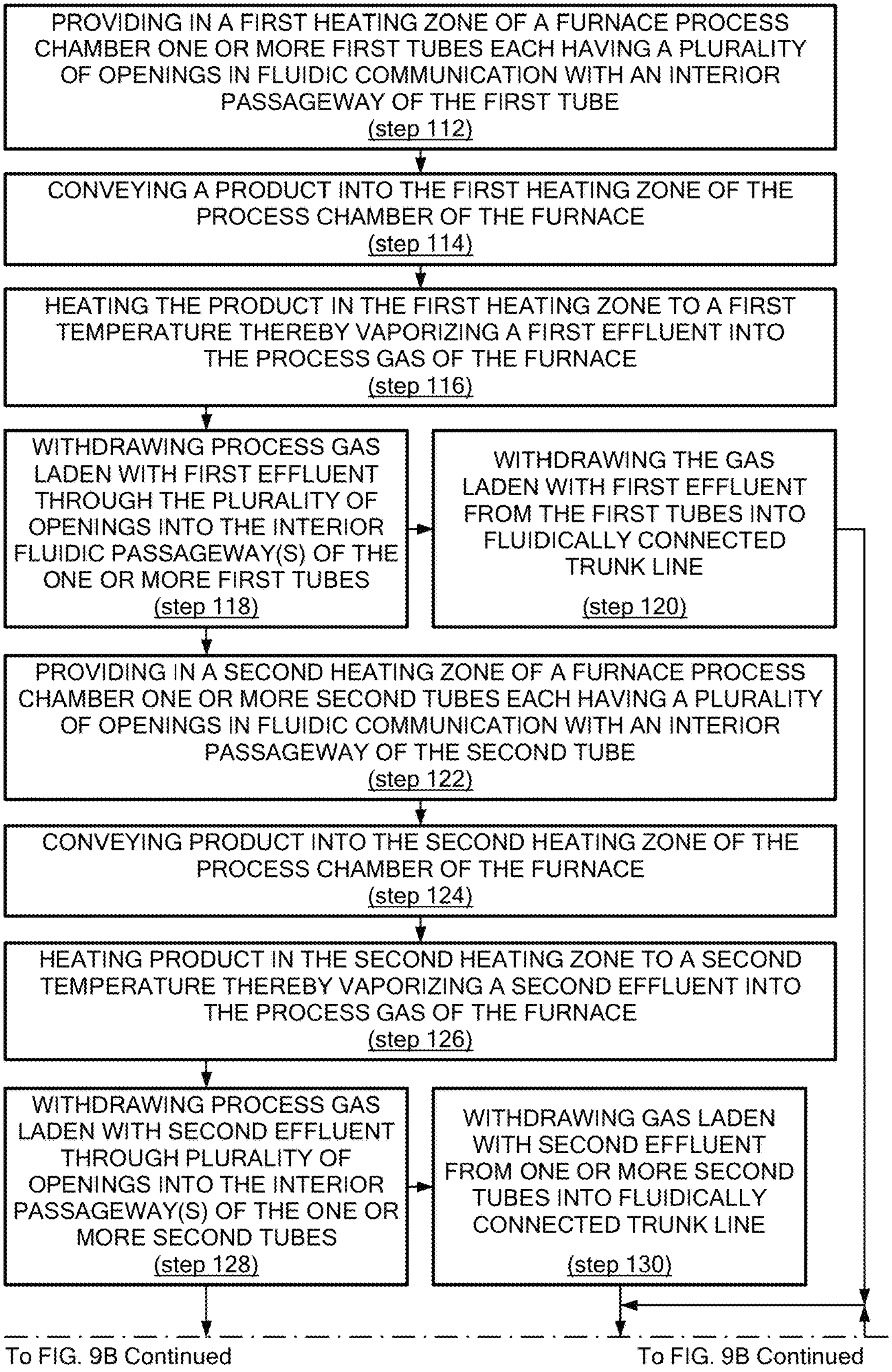
FIG. 9B is a flow chart which illustrates the steps of the method according to a non-limiting embodiment of the invention

For a non-limiting example, in one non-limiting embodiment as shown in FIG. 9B, the method of the invention includes providing in a first heating zone of a process chamber of a furnace one or more first extraction tubes each having a plurality of openings or slots in fluidic communication with an interior passageway, as illustrated by step 112; introducing or conveying a product into the first heating zone of the process chamber; heating the product in the first heating zone to a first temperature thereby vaporizing a first effluent into the process gas of the furnace, as illustrated by step 116; withdrawing the process gas laden with first effluent through the plurality of openings or slots into the interior fluidic passageway(s) of the one or more first extraction tubes, as illustrated by step 118; and withdrawing the gas laden with first effluent from the one or more first extraction tubes into a fluidically connected trunkline, as illustrated by step 120. In a non-limiting example, the first heating zone can be operated in a temperature range of 70° C. to 100° C. In such a temperature range, light solvents can vaporize and can be withdrawn through the first extraction tube(s) and the fluidically connected trunkline.

The method also includes providing in a second heating zone of a process chamber of a furnace one or more second extraction tubes each having a plurality of openings or slots in fluidic communication with an interior passageway, as illustrated by step 122; introducing or conveying the product into the second heating zone of the process chamber, as illustrated by step 124; heating the product in the second heating zone to a second temperature thereby vaporizing a second effluent into the process gas of the furnace, as illustrated by step 126; withdrawing the process gas laden with second effluent through the plurality of openings or slots into the interior passageway(s) of the one or more second extraction tubes, as illustrated by step 128; and withdrawing the gas laden with the second effluent from the second extraction tubes into the fluidically connected trunkline as illustrated by step 130. In a non-limiting example, the second heating zone can be operated in a temperature range of 100° C. to 200° C. In such a temperature range, second effluent including, for non-limiting examples, heavy solvent and flux resin constituents can vaporize and can be withdrawn through the second extraction tube(s) and the fluidically connected trunkline.

The method also includes providing in a third heating zone of a process chamber of a furnace one or more third extraction tubes each having a plurality of openings or slots fluidically connected to an interior passageway of the tube, as illustrated by step 132; introducing or conveying the product into the third heating zone of the process chamber as illustrated by step 134; heating the product in the third heating zone to a third temperature thereby vaporizing a third effluent into the process gas of the furnace as illustrated by step 136; withdrawing the process gas laden with third effluent through the plurality of openings or slots into the interior passageway(s) of the one or more third extraction tubes as illustrated by step 138; and withdrawing the gas laden with the third effluent from the one or more third extraction tubes into the fluidically connected trunkline as illustrated by step 140. In a non-limiting example, the third heating zone can be operated in a temperature range of 200° C. to 300° C. In such a temperature range, third effluent including, for non-limiting examples, volatilized and combusted flux can vaporize and can be withdrawn through the one or more third extraction tubes and the fluidically connected trunkline.

In other non-limiting embodiments, the method includes passing the effluent laden gas from the trunkline to an effluent management system for scrubbing or cleaning effluent from the gas, as illustrated by step 142; cooling the cleaned gas; as illustrated by step 144; and recycling the scrubbed or cleaned gas back into the process chamber of the furnace as illustrated by step 145. In other non-limiting embodiments, after heating the product in the three heating zones of the process chamber, the method includes conveying the heated product into a cooling section of the furnace for cooling the product as illustrated by step 146; and conveying the product through an exit of the furnace as illustrated by step 148.

Figure 9B:
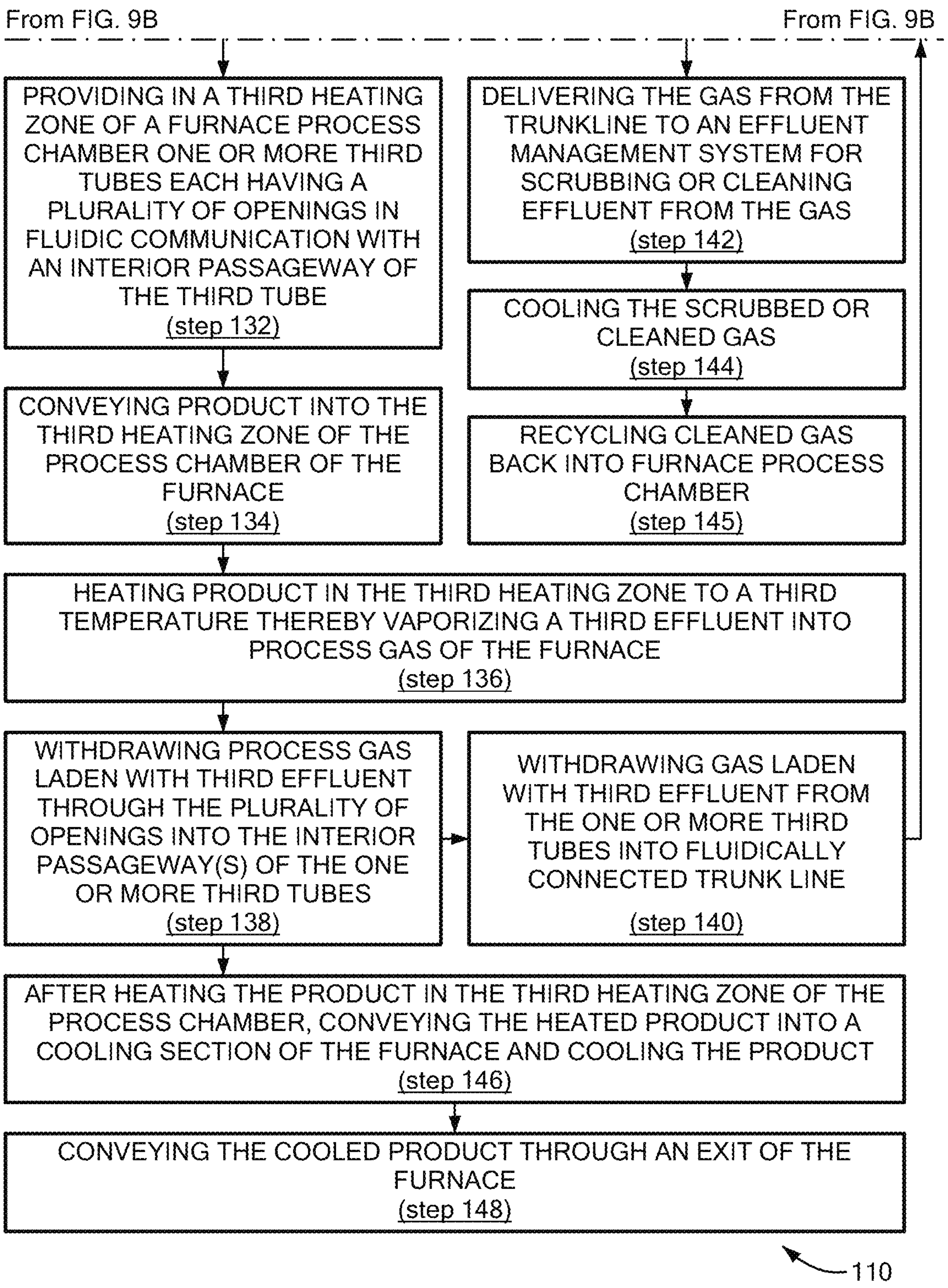

In the systems, devices and method of the invention, the extraction trunkline can be disposed exterior to the process chamber but preferably at least a first part of the extraction trunkline is included within the process chamber, as discussed above. In different embodiments the cleaned process gas is cooled either in the cooling section of the furnace or in a cooler separate from the furnace prior to recycling the process gas back into the furnace process chamber, although in other embodiments cleaned process gas is not recycled back into the furnace. In different embodiments, the product can be cooled in a cooling section which is incorporated in the furnace, as shown in the flow charts of FIG. 9, or alternatively, after heating the product can be conveyed through the exit of the furnace and the product cooled in a cooler disposed outside of the furnace.

EXAMPLE 1

Extraction tests were conducted using different extraction configurations using a Pyramax 150 oven or furnace. The Pyramax 150 oven included a process chamber having a length of 156 inches and a width of 32 inches. The process chamber of the Pyramax 150 oven included 12 separate heating zones disposed linearly in a consecutive sequence along the travelling path of a product conveyor belt. The Pyramax 150 oven also included a cooling section. The product conveyor belt passed into the entrance of the oven into the process chamber including 12 consecutive heating zones and subsequently through a cooling section including a cooler 1 before exiting the oven. Process gas including air which was extracted from the oven was passed through an effluent management system where effluent was scrubbed or cleaned from the gas. The cleaned process gas was then passed through the cooling section of the oven including a cooler 1 and recycled back into the oven at the bottom of heating zones 1, 7 and 10. The same return configuration for the recycle of cooled effluent process gas back into oven was used for each extraction configuration described below.

Deposition targets including five-inch diameter polished silicon wafers or coupons were attached at three different locations along the Pyramax 150 oven for deposition or collection of condensed effluent including flux condensed from process gas during operation of the oven. Before testing, each of the coupons was weighed to establish a tare weight. After each test, each coupon was re-weighed and the tare weight subtracted to determine the weight of effluent deposited on the respective coupon. Each coupon was then cleaned and re-weighed to determine a new tare weight prior to the next test.

Figure 10A:
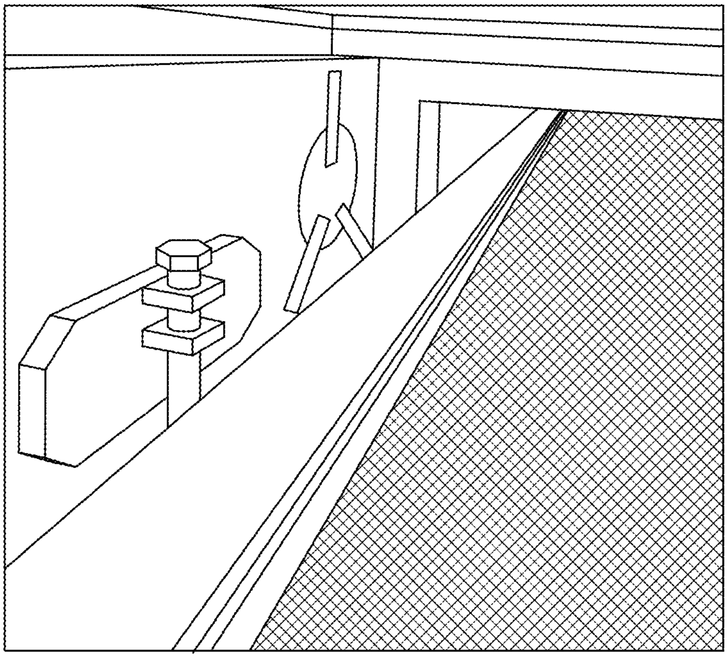
FIG. 10A is a view showing placement of deposition target used in the testing of a non-limiting embodiment of the invention.
Figure 10B:
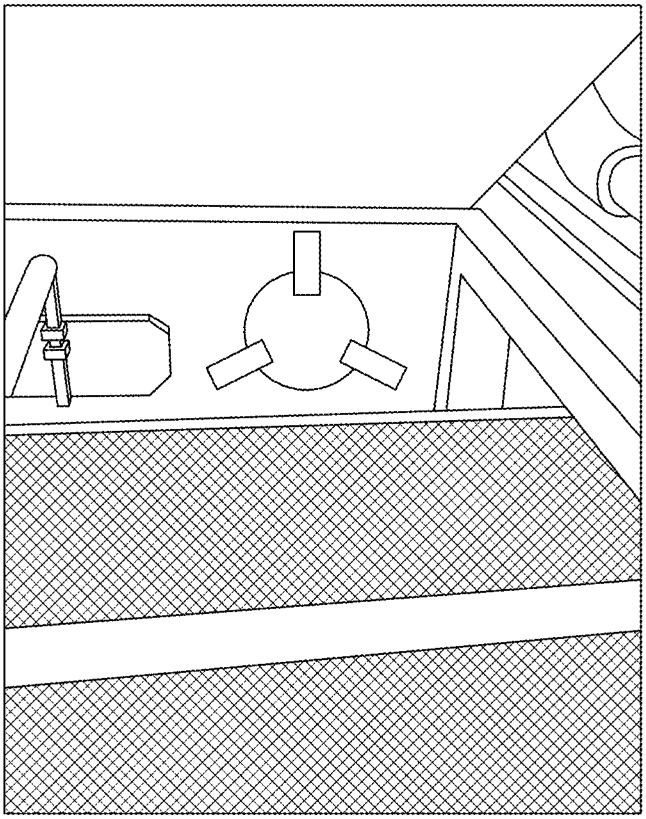
FIG. 10B is a view showing placement of deposition target used in the testing of a non-limiting embodiment of the invention.
Figure 10C:
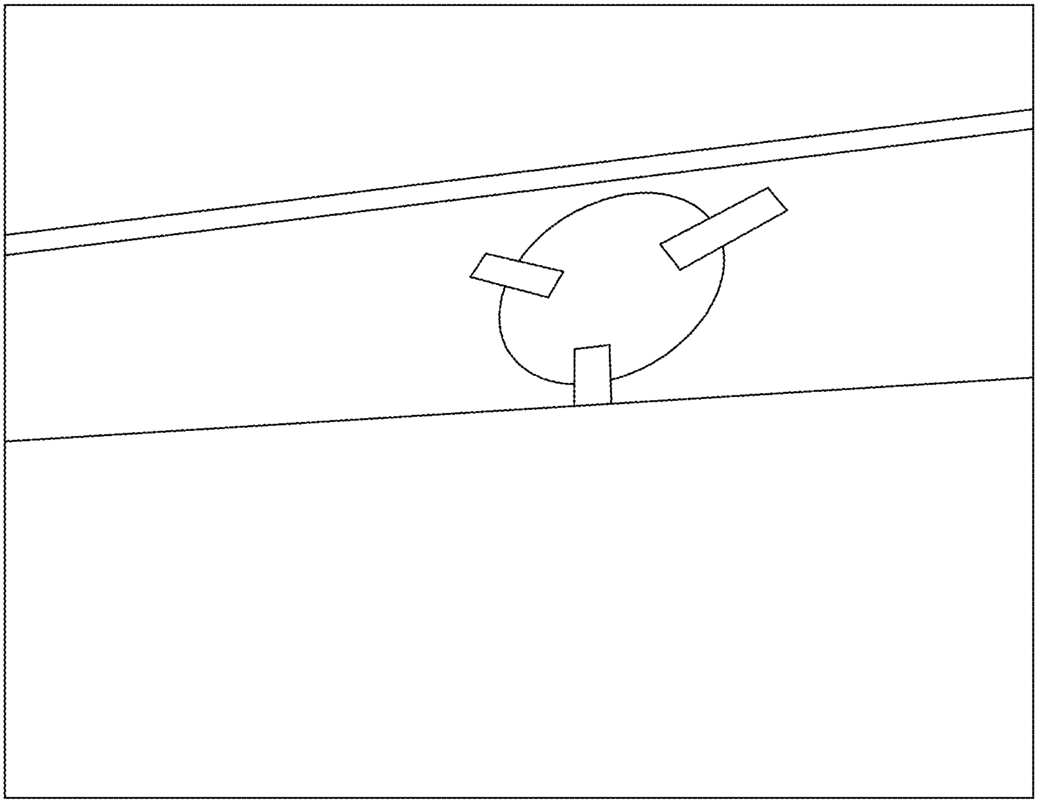
FIG. 10C is a view showing placement of deposition target used in the testing of a non-limiting embodiment of the invention.

A first deposition target corresponding to Coupon #1 was attached on the near side of the oven inside wall near heating zone 1, as shown in FIG. 10A. A second deposition target corresponding to Coupon #2 was attached on the far side of the oven inside wall near heating zone 12, as shown in FIG. 10B. A third deposition target corresponding to Coupon #3 was attached on the outside wall of the cooler 1 top area of the cooling section, as shown in FIG. 10C.

Square aluminum plates having dimensions of 12-inch by 12-inch were used to simulate product passing through the oven. Prior to each test, a volumetric amount corresponding to 50 grams of Indium Corporation Floxot-84999Y flux was deposited on each aluminum plate. Each aluminum plate including the deposited flux was then passed through the oven having a particular extraction configuration including a particular set of heating conditions and residence times. The plates were not weighed before or after the test. After the test, each aluminum plate was cleaned, 50 grams of Indium Corporation Floxot-84999Y flux was reapplied volumetrically to each plate, and each plate was then passed through the oven according to the next extraction configuration. An amount of 300 to 400 aluminum plates were used in testing. Oven residence times for the aluminum plates varied between a period of 5 to 6 hours depending upon the extraction test.

The density of white smoke exiting the oven entrance during loading of the test plates onto the product conveyor was recorded based on a visual observation range of 1-10 with the rating of 10 and 1 corresponding to the respective highest and lowest level of white smoke density observed. The product conveyor included a chain driven edge conveyor that supported two opposing edges of the product using two separate rail/chain assemblies. These rails were moved in or out against each other to accommodate different product sizes.

Two-inch outside diameter or O.D., 0.049-inch wall thickness 304 stainless steel was used for the extraction trunklines. One-inch outside diameter or O.D., 0.035-inch wall thickness 304 stainless steel or S.S. tubing was used for extraction tubes also called branches.

Baseline Test

The extraction configuration for the baseline test included an extraction port at the bottom of each of heating zones 3 and 1. Each extraction port included a 2-inch manual ball valve and KF50 fitting connected to a KF50 flex line.

Extraction Test #1

Figure 11A:
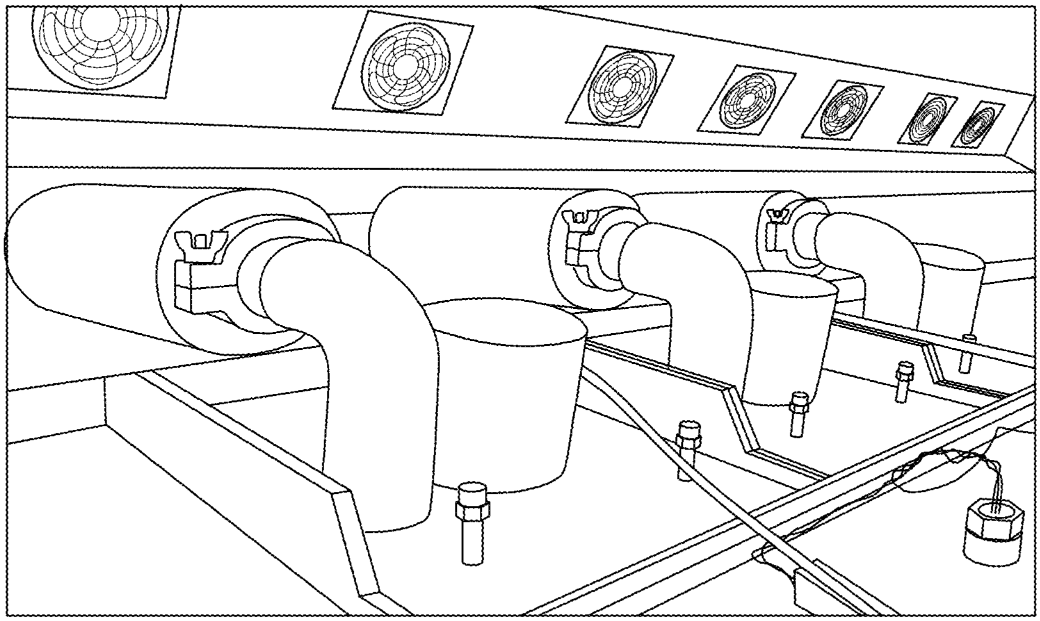
FIG. 11A is a view of an extraction configuration used in the testing of non-limiting embodiment of the invention.
Figure 11B:
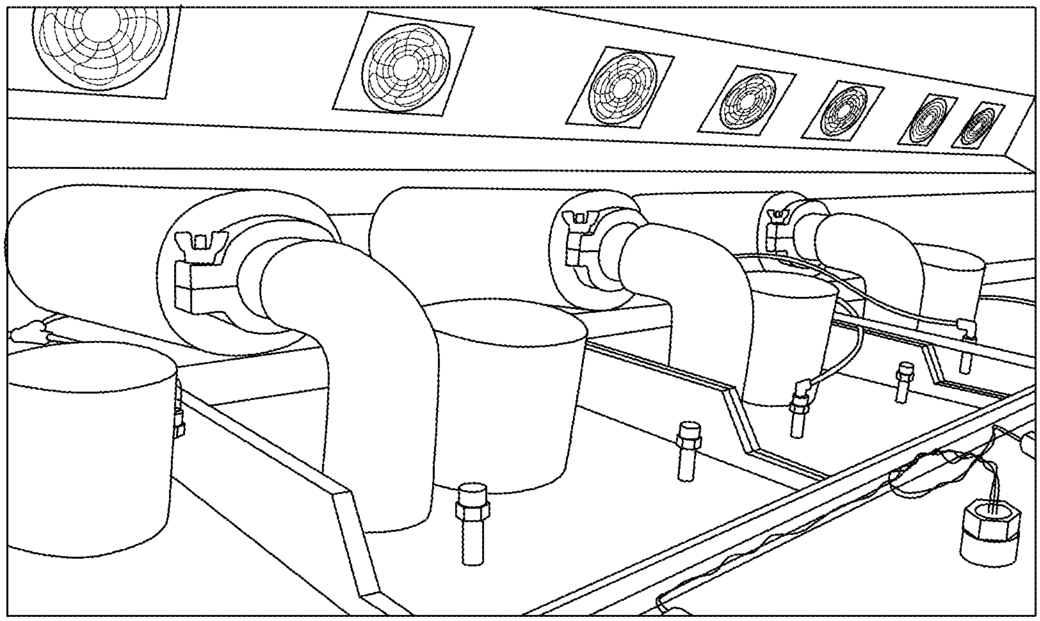
FIG. 11B is a view of an extraction configuration used in the testing of a non-limiting embodiment of the invention
Figure 11C:
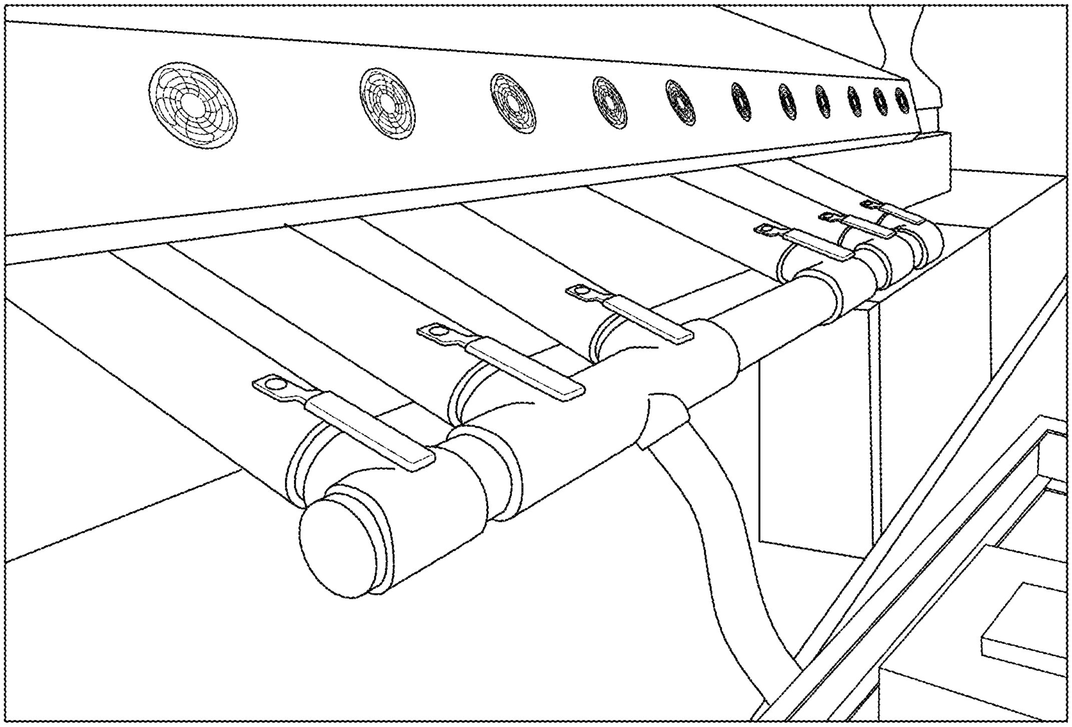
FIG. 11C is a view of an extraction configuration used in the testing of a non-limiting embodiment of the invention.

The extraction configuration for Extraction Test #1 is shown in FIGS. 11A, 11B and 11C. The extraction configuration for Extraction Test #1 included extraction ports disposed at the top of heating zones 5, 6, 7, 10, 11 and 12. Each extraction port included a 2-inch size manual ball valve and KF50 fitting connected to a KF50 flex line.

Extraction Test #2

Figure 12A:
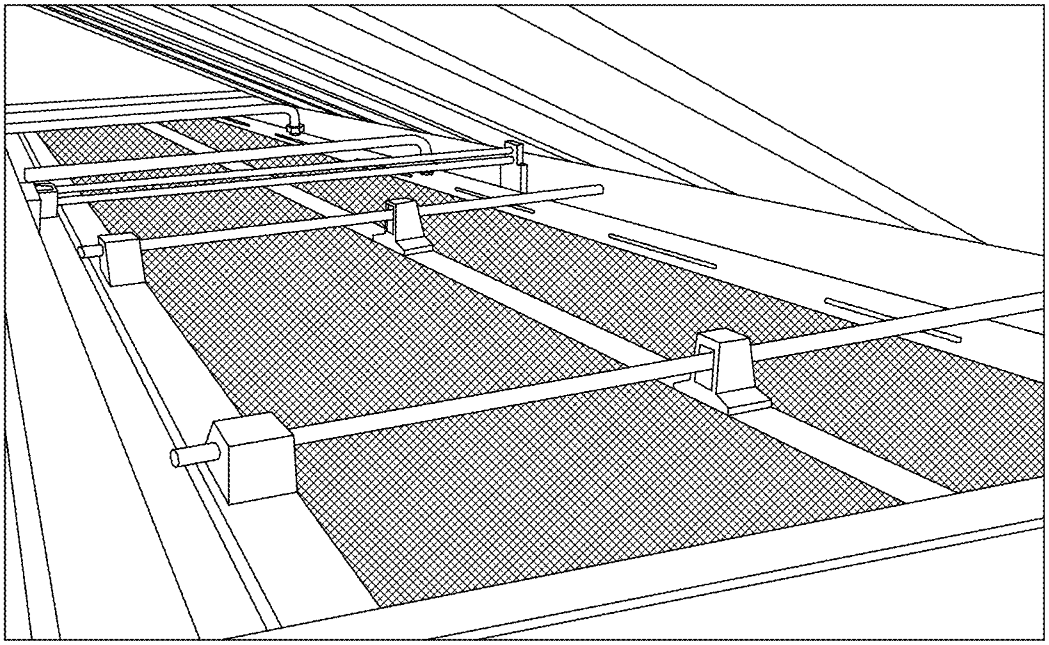
FIG. 12A is a view of an extraction configuration used in the testing of a non-limiting embodiment of the invention.
Figure 12B:
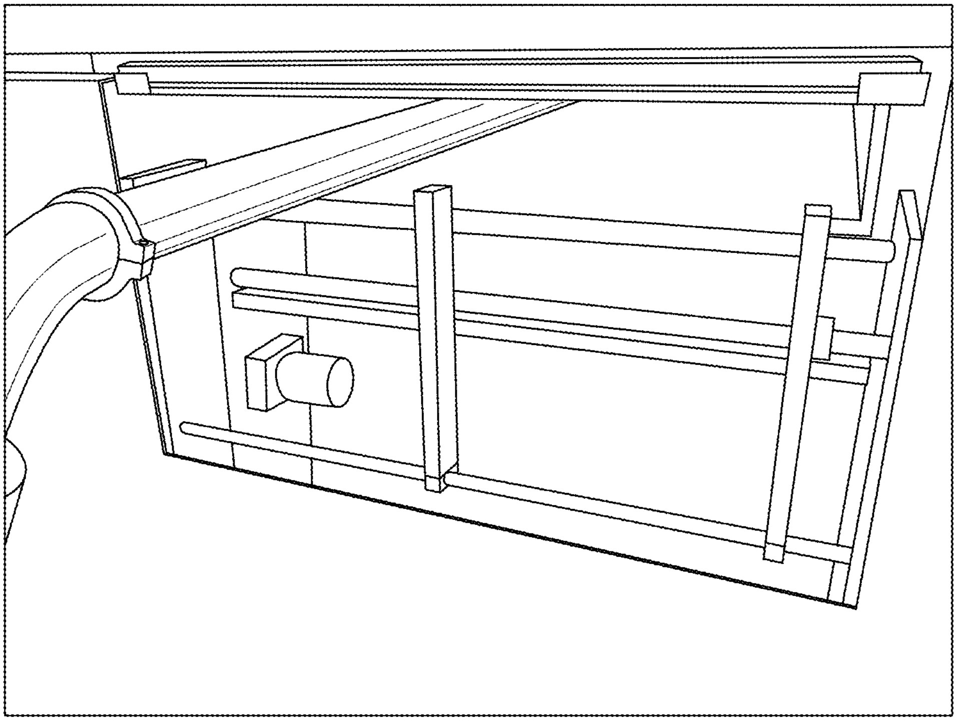
FIG. 12B is a view of an extraction configuration used in the testing of a non-limiting embodiment of the invention.
Figure 12C:
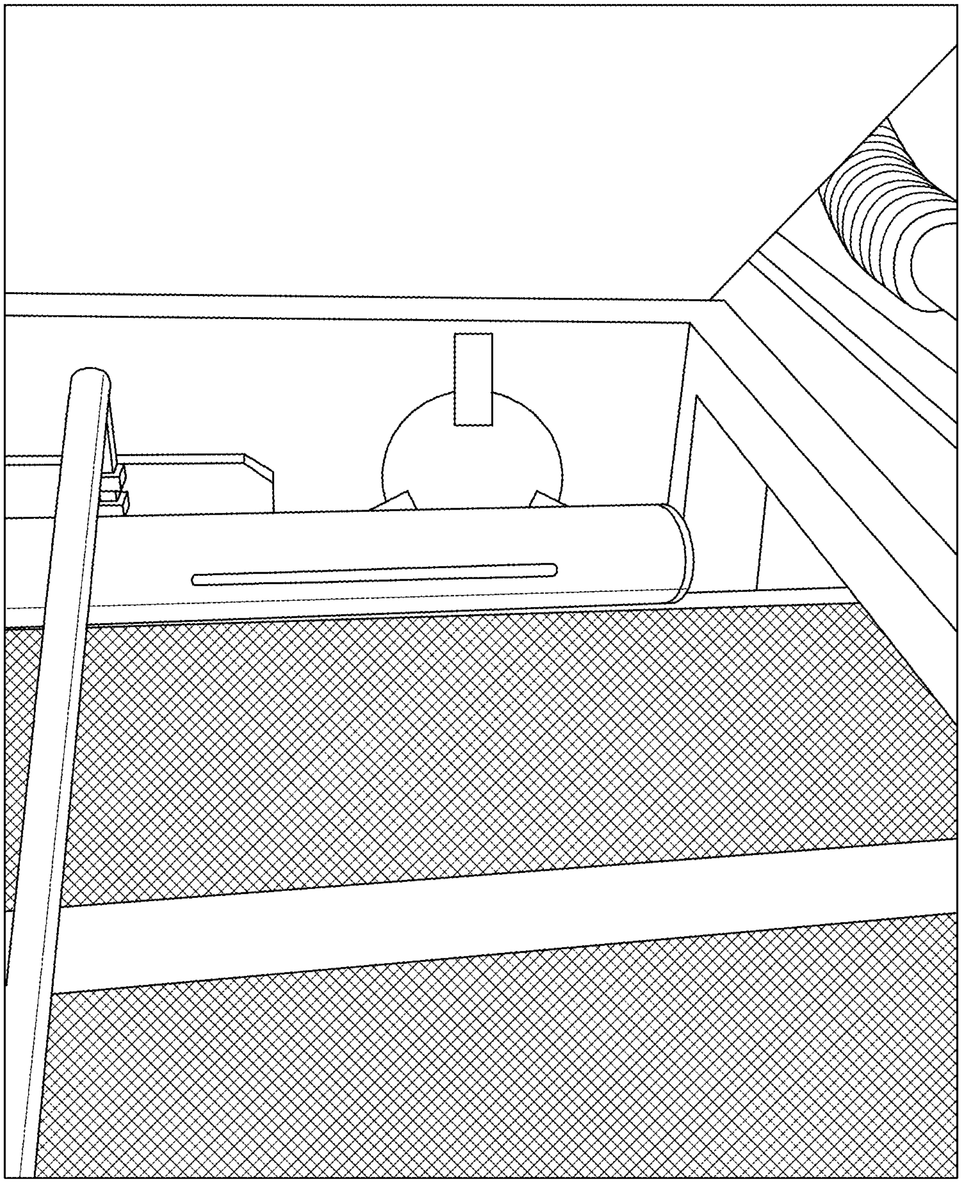
FIG. 12C is a view of an extraction configuration used in the testing of a non-limiting embodiment of the invention.

The extraction configuration for Extraction Test #2 is shown in FIGS. 12A, 12B and 12C. The extraction configuration for Extraction Test #2 included a single extraction trunkline having a length of 192 inches disposed at the far side inside the process chamber next to the product conveyor belt and running along the length of the process chamber including heating zones 1-12, as show in FIG. 12A. The extraction trunkline was equipped with a K50 flange at a first end of the extraction trunkline and a blank cap at a second end of the extraction trunkline. The K50 flange fluidically connected the extraction trunkline to an outlet connection protruding at the entrance of the process chamber of the oven, as shown in FIG. 12B.

The extraction trunkline included ten (10) horizontal extraction ports disposed linearly along the trunkline adjacent to heating zones 3 to 12. Each of the horizontal extraction port measured 0.125 inches×6 inches.

Effluent laden process gas from the oven was extracted through the horizonal extraction ports into the single extraction trunkline. The effluent laden gas passed through and exited the extraction trunkline through the K50 flange and passed through and exited the oven through the outlet connection disposed at the entrance to the oven.

Extraction Test #3

Figure 13B:
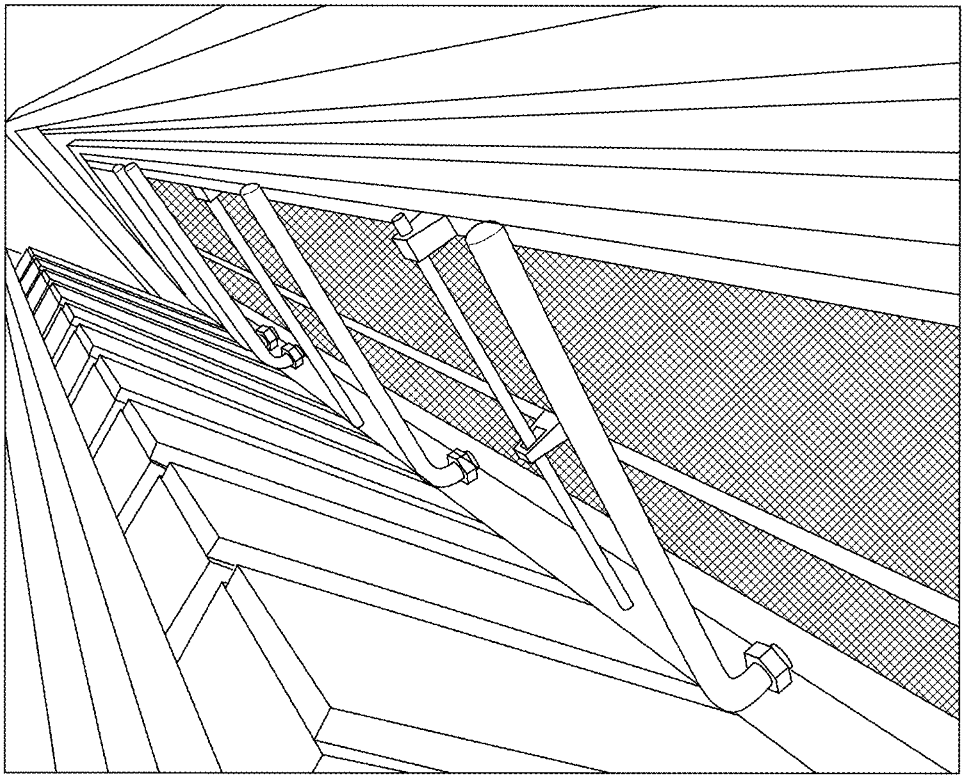
FIG. 13B is a view of an extraction configuration used in the testing of a non-limiting embodiment of the invention.
Figure 13A:
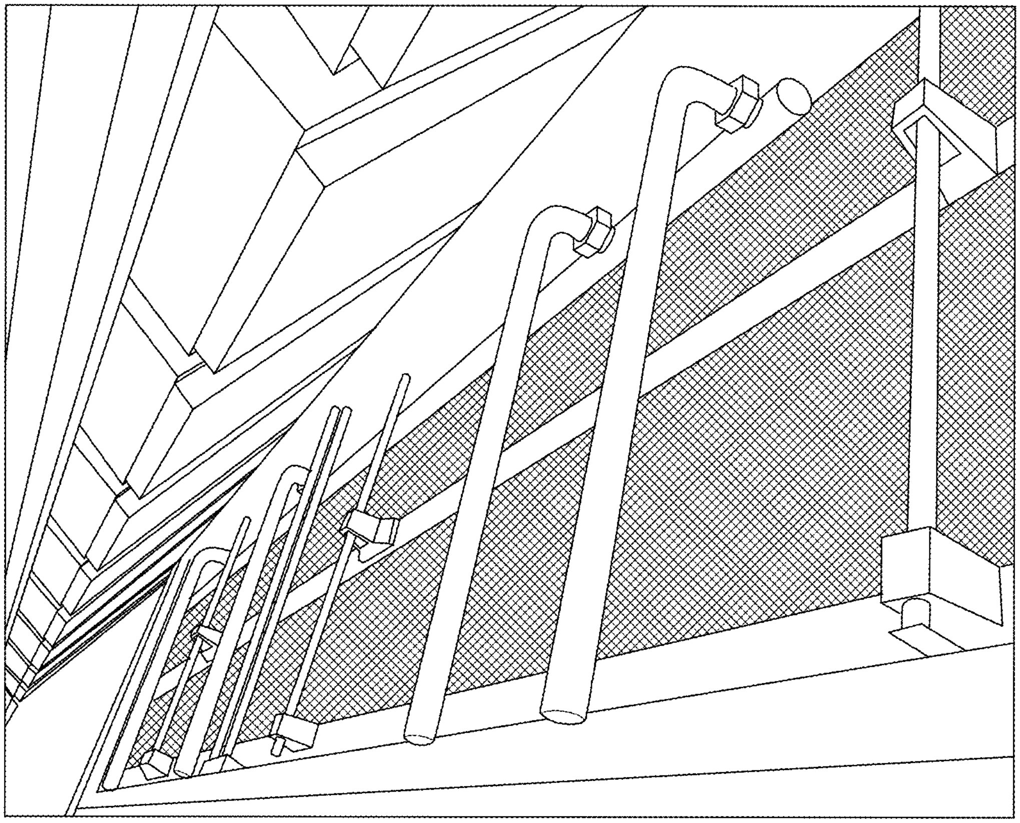
FIG. 13A is a view of an extraction configuration used in testing of a non-limiting embodiment of the invention.

The extraction configuration for Extraction Test #3 is shown in FIGS. 13A and 13B. The extraction configuration for Extraction Test #3 included a single extraction trunkline having a length of 180 inches disposed at the far side inside the process chamber next to the product conveyor belt and running along the length of the process chamber including heating zones 1-12, as show in FIGS. 13A and 13B. The extraction trunkline was equipped with a K50 flange at a first end of the extraction trunkline and a blank cap at a second end of the extraction trunkline. The K50 flange fluidically connected the extraction trunkline to an outlet connection protruding at the entrance of the process chamber of the oven, similar to the extraction configuration of Extract Test #2.

Four individual extraction tubes or branches were fluidically connected to the extraction trunkline. Each of the four extraction tubes or branches was fluidically connected to the extraction trunkline at a first end and included a blank cap at a second end. The first extraction tube or branch was located between heating zones 2 and 3. The second extraction tube or branch was located between heating zones 5 and 6. The third extraction tube or branch was located between heating zones 9 and 10. The fourth extraction tube or branch was located between heating zones 10 and 11. Each of the four extraction tubes had a length of 29.5 inches as measured from the center radius of the coupling opening to the end of the tube at the cap. Thus, each extraction tube length corresponded to a percentage of the 32-inch width of the process chamber including the heating zones in range of 80% to 100%. Each extraction tube included four slots spaced one inch apart. Each slot had a 5-inch in length and 0.25-inch in width.

Effluent laden process gas from the oven was extracted from the process chamber through the horizonal slots of each of the four extraction tubes or branches. The effluent laden gas passed through the extraction tubes into the extraction trunkline. The effluent laden process gas passed along and exited the extraction trunkline through the K50 flange into the outlet connection. The effluent laden gas passed through and exited the oven through the outlet connection for subsequent processing in the effluent management system.

Extraction Test #4

Figure 14B:
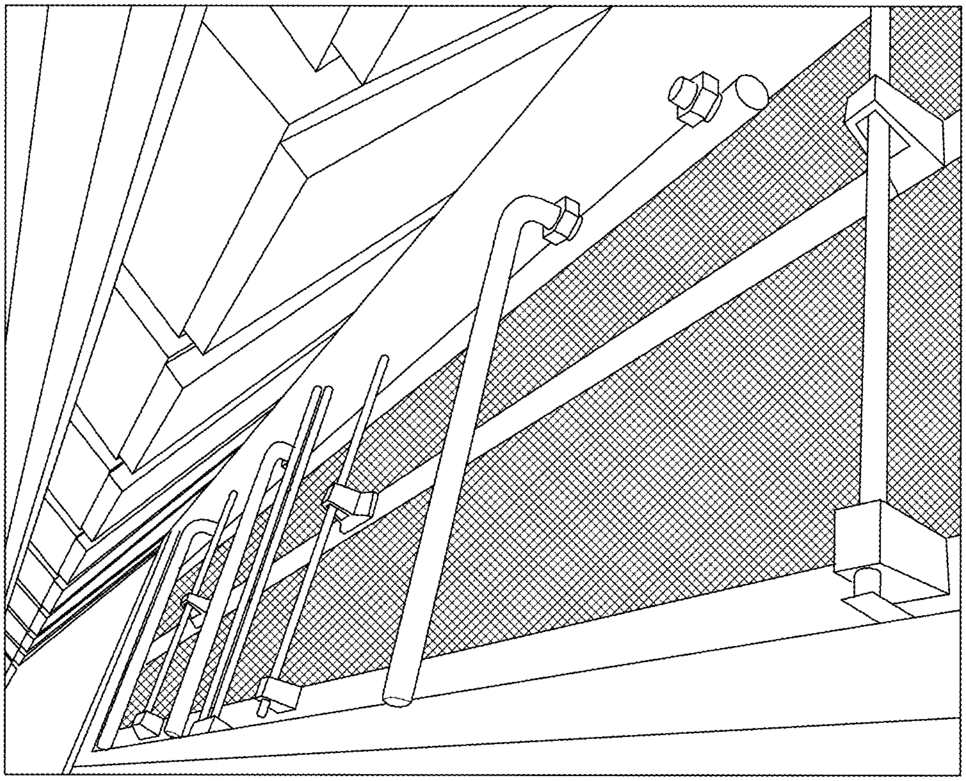
FIG. 14B is a view of an extraction configuration used in the testing of a non-limiting embodiment of the invention.
Figure 14A:
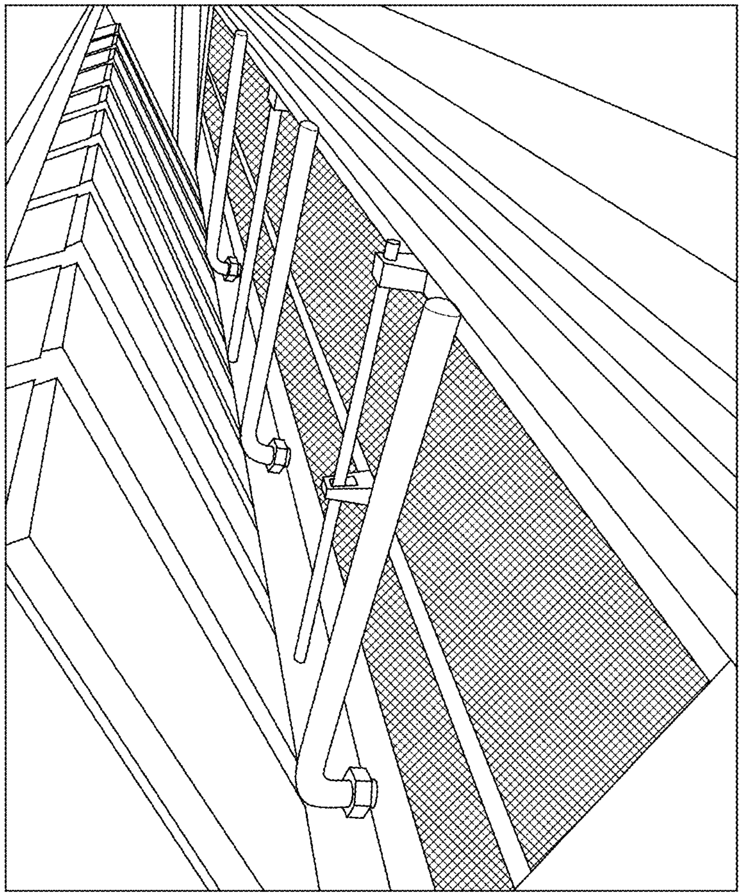
FIG. 14A is a view of an extraction configuration used in the testing of a non-limiting embodiment of the invention.

The extraction configuration for Extraction Test #4 is shown in FIGS. 14A and 14B. The extraction configuration for Extraction Test #4 included a single extraction trunkline having a length of 180 inches disposed at the far side inside the process chamber next to the product conveyor belt and running along the length of the process chamber including heating zones 1-12, as show in FIGS. 14A and 14B. The extraction trunkline was equipped with a K50 flange at a first end of the extraction trunkline and a blank cap at a second end of the extraction trunkline. The K50 flange fluidically connected the extraction trunkline to an outlet connection protruding at the entrance of the process chamber of the oven, similar to the extraction configurations of Extraction Test #2 and #3.

Three individual extraction tubes or branches were fluidically connected to the extraction trunkline. Each of the three extraction tubes or branches was fluidically connected to the extraction trunkline at a first end and included a blank cap at a second end. The first extraction tube or branch was disposed between heating zones 2 and 3. The second extraction tube or branch was disposed between heating zones 5 and 6. The third extraction branch or tube was disposed between heating zones 9 and 10. Each of the three extraction tubes had a length of 29.5 inches as measured from the center radius of the coupling opening to the end of the tube at the cap. Thus, each extraction tube length corresponded to a percentage of the 32-inch width of the process chamber including the heating zones in range of 80% to 100%. Each extraction tube included four slots spaced one inch apart. Each slot had a 5-inch in length and 0.25-inch in width.

Effluent laden process gas from the oven was extracted from the process chamber through the horizonal slots of each of the three extraction tubes or branches. The effluent laden gas passed through the extraction tubes into the extraction trunkline. The effluent laden process gas passed along and exited the extraction trunkline through the K50 flange into the outlet connection. The effluent laden gas passed through and exited the oven through the outlet connection for subsequent processing in the effluent management system.

Extraction Test #5

Figure 15B:
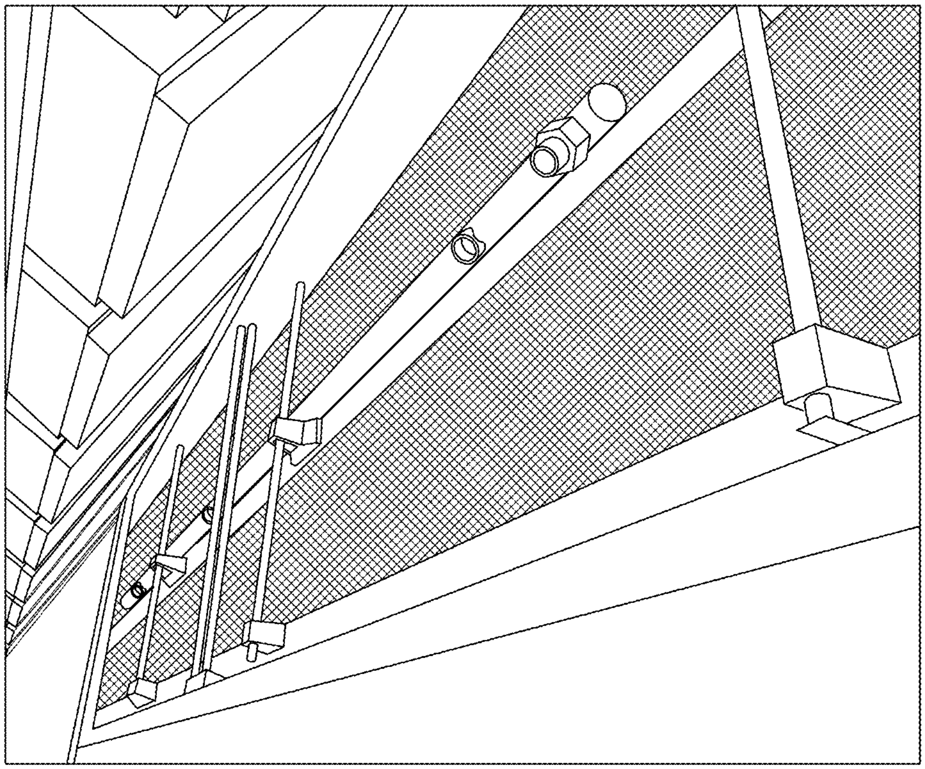
FIG. 15B is a view of an extraction configuration used in the testing of a non-limiting embodiment of the invention.
Figure 15A:
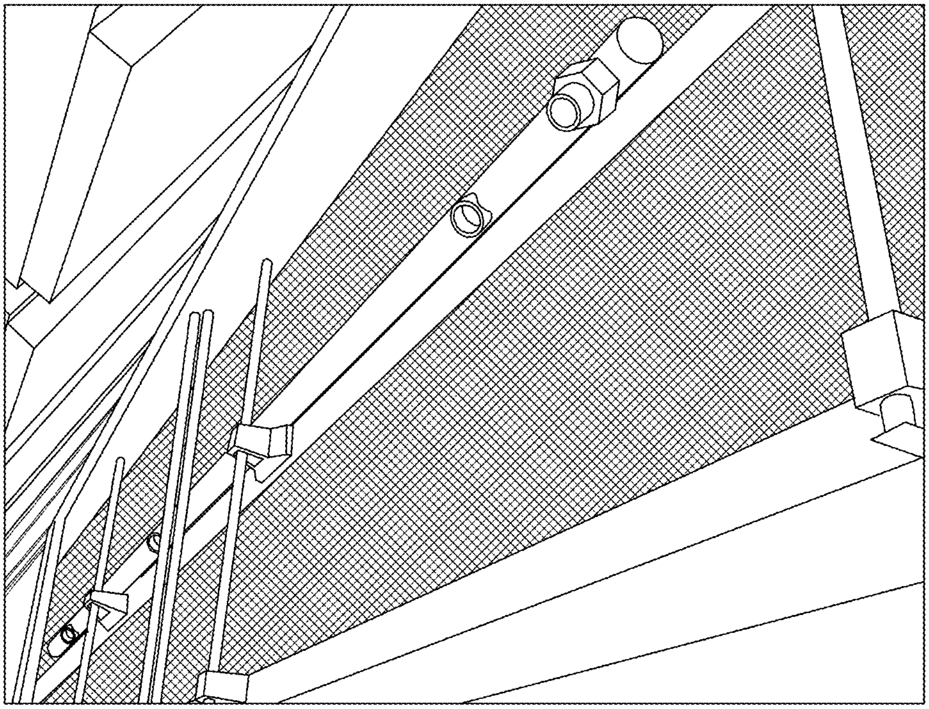
FIG. 15A is a view of an extraction configuration used in the testing of a non-limiting embodiment of the invention.
Figure 15C:
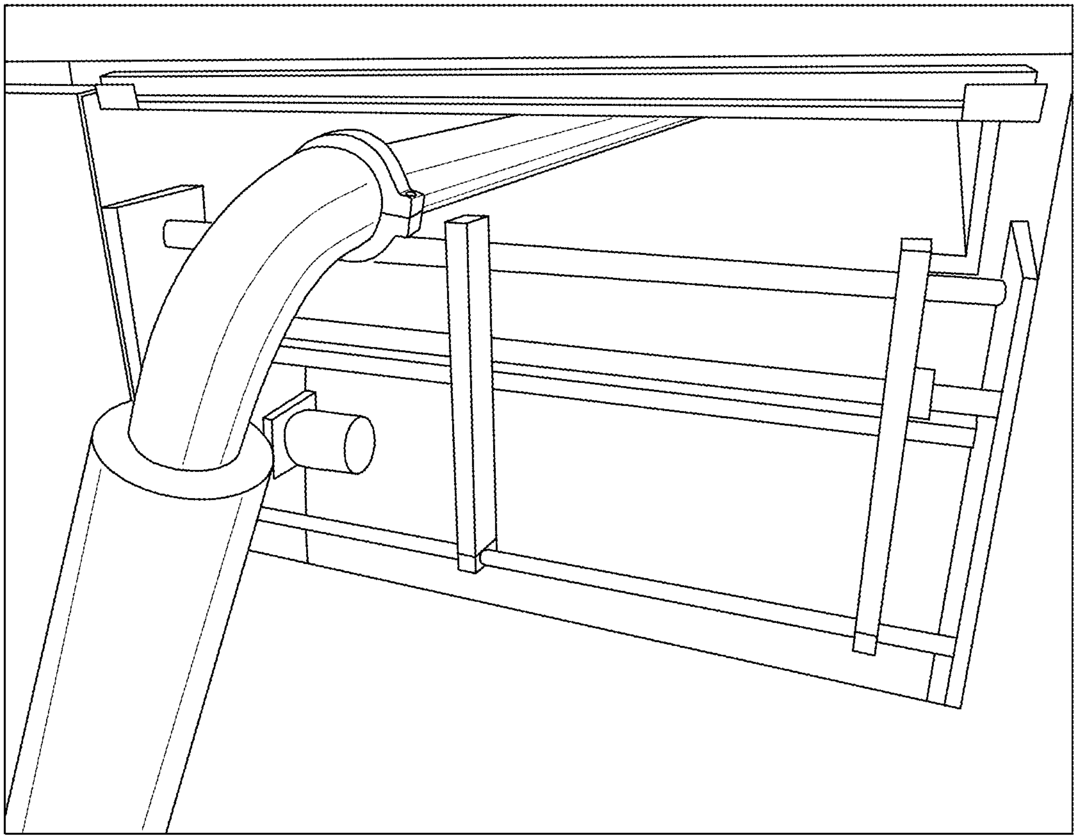
FIG. 15C is a view of an extraction configuration used in the testing of a non-limiting embodiment of the invention.

The extraction configuration for Extraction Test #5 is shown in FIGS. 15A, 15B, and 15C. The extraction configuration for Extraction Test #5 included a single extraction trunkline having a length of 156 inches disposed at the far side inside the process chamber next to the product conveyor belt and running along the length of the process chamber including heating zones 1-12, as show in FIGS. 15A and 15B. The extraction trunkline was equipped with a K50 flange at a first end of the extraction trunkline and a blank cap at a second end of the extraction trunkline. The K50 flange fluidically connected the extraction trunkline to an outlet connection protruding at the entrance of the process chamber of the oven, as shown in FIG. 15C and similar to the extraction configurations of Extraction Test #2, #3 and #4.

The extraction trunkline corresponded to the extraction trunkline of Extraction Test #4 but without the extraction tubes or branches. In lieu of extraction tubes, the extraction trunkline included three extraction ports including one-inch diameter union connections. The first extraction port was located between heating zones 2 and 3. The second extraction port was located between heating zones 5 and 6. The third extraction port was located between heating zones 9 and 10.

Effluent laden process gas from the oven was extracted from the process chamber through the three extraction ports into the extraction trunkline. The effluent laden process gas passed along and exited the extraction trunkline through the K50 flange into the outlet connection. The effluent laden gas passed through and exited the oven through the outlet connection for subsequent processing in the effluent management system.

Extraction Test #6

Figure 16A:
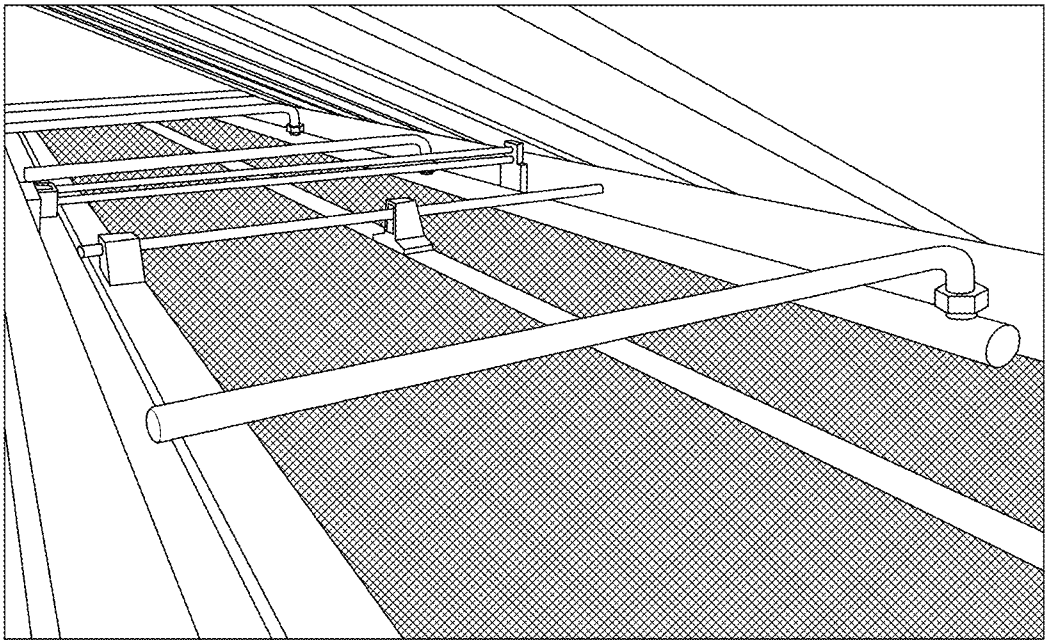
FIG. 16A is a view of an extraction configuration used in the testing of a non-limiting embodiment of the invention.
Figure 16B:
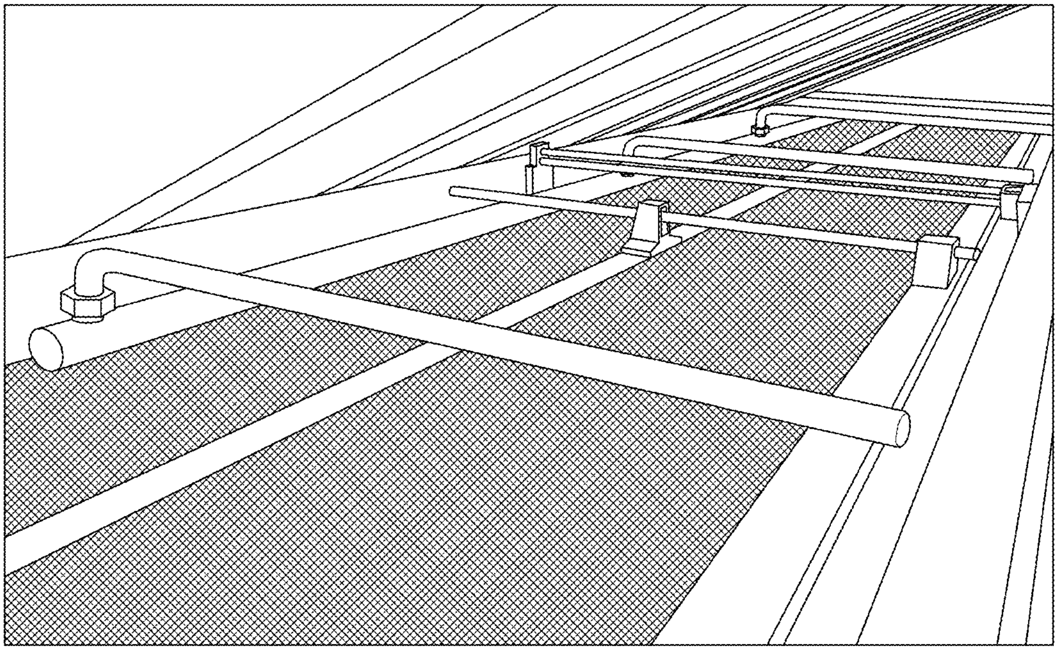
FIG. 16B is a view of an extraction configuration used in the testing of a non-limiting embodiment of the invention.
Figure 16C:
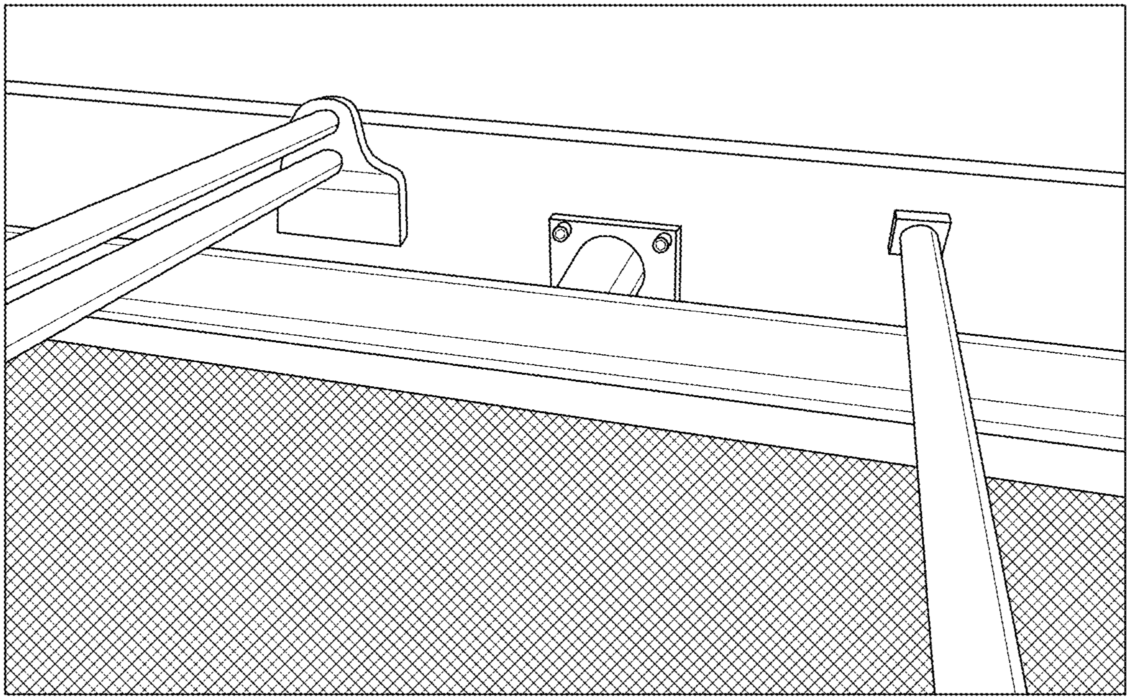
FIG. 16C is a view of an extraction configuration used in the testing of non-limiting embodiment of the invention.

The extraction configuration for Extraction Test #6 is shown in FIGS. 16A, 16B and 16C. The extraction configuration for Extraction Test #6 included a single extraction trunkline a length 92 inches disposed at the far side inside the process chamber next to the product conveyor belt and running along the length of the process chamber including heating zones 1-12, as show in FIGS. 16A and 16B. The extraction trunkline was equipped with a blank cap disposed at a first end of the extraction trunkline and a blank cap disposed at a second opposing end of the extraction trunkline. The extraction trunkline was fluidically connected to an outlet connection protruding from the back of process chamber in the area of heating zone 7, as shown in FIG. 16C.

Three individual extraction tubes or branches were fluidically connected to the extraction trunkline. Each of the three extraction tubes or branches was fluidically connected to the extraction trunkline at a first end and included a blank cap at a second end. The first extraction tube or branch was disposed between heating zones 2 and 3. The second extraction tube or branch was disposed between heating zones 5 and 6. The third extraction tube or branch was disposed between heating zones 9 and 10. Each of the three extraction tubes had a length of 29.5 inches as measured from the center radius of the coupling opening to the end of the tube at the cap. Thus, each extraction tube length corresponded to a percentage of the 32-inch width of the process chamber including the heating zones in range of 80% to 100%. Each extraction tube included four slots spaced one inch apart. Each slot had a 5-inch in length and 0.25-inch in width.

Figure 16D:
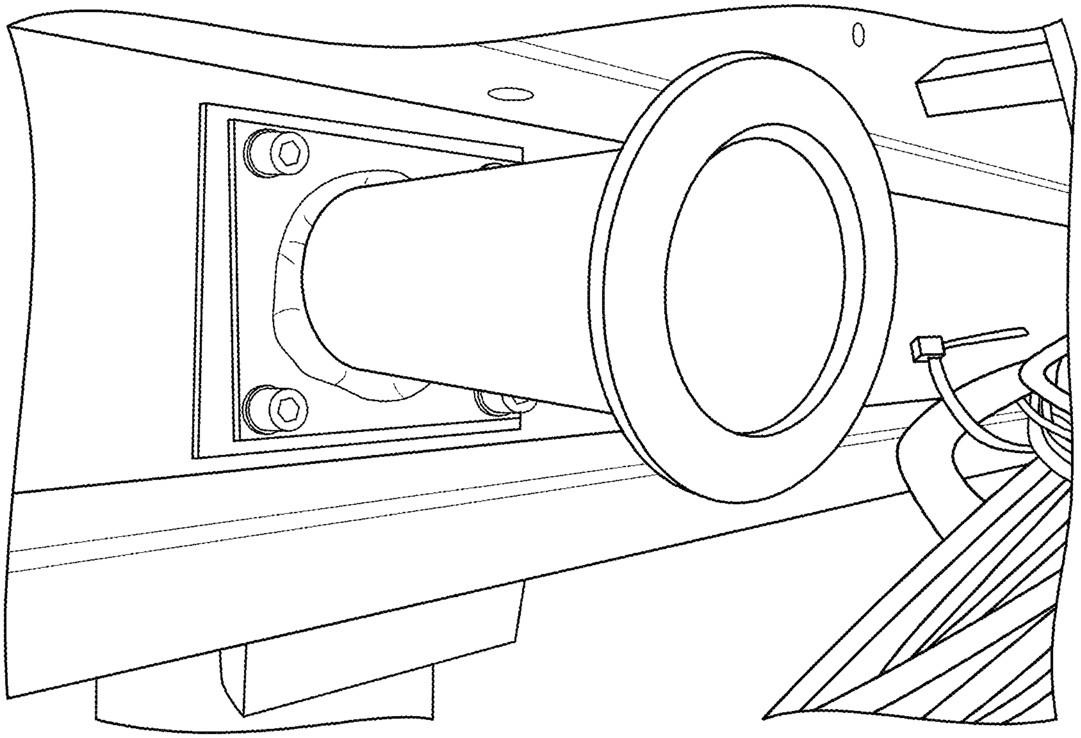
FIG. 16D is a view of an extraction configuration used in the testing of a non-limiting embodiment of the invention.
Figure 16E:
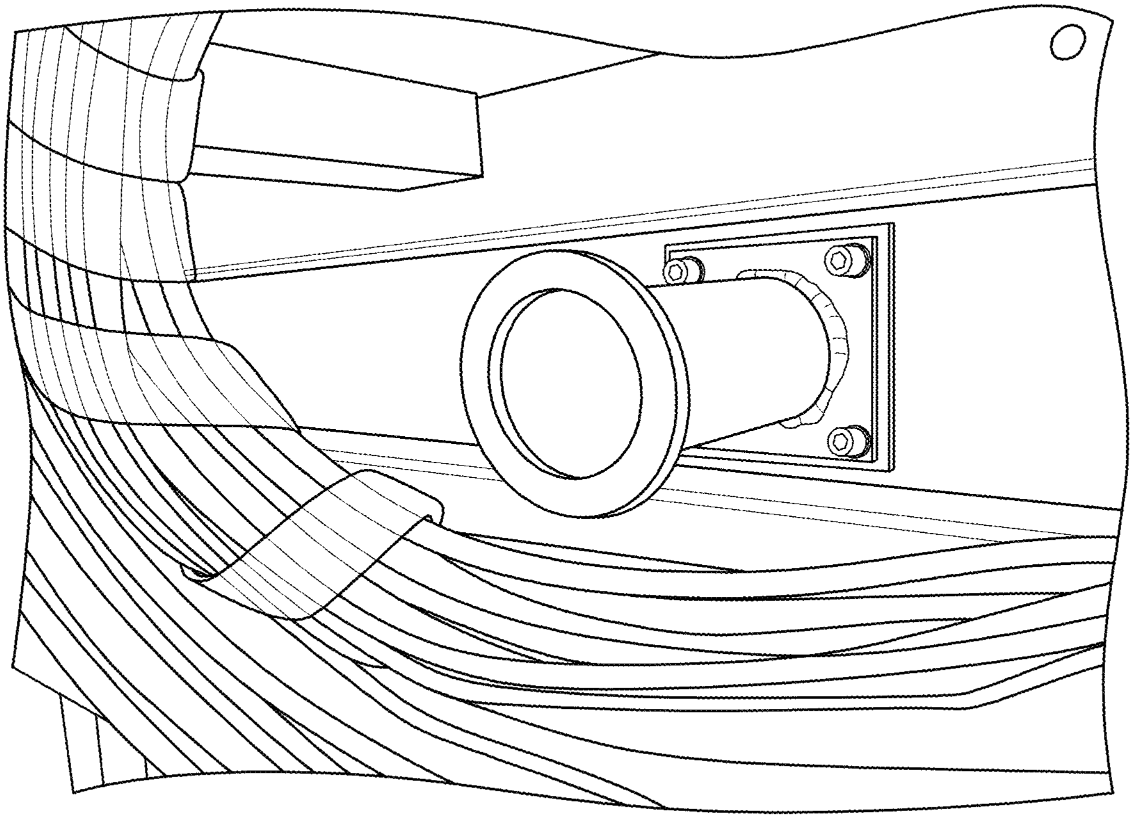
FIG. 16E is a view of an extraction configuration used in the testing of a non-limiting embodiment of the invention.
Figure 16F:
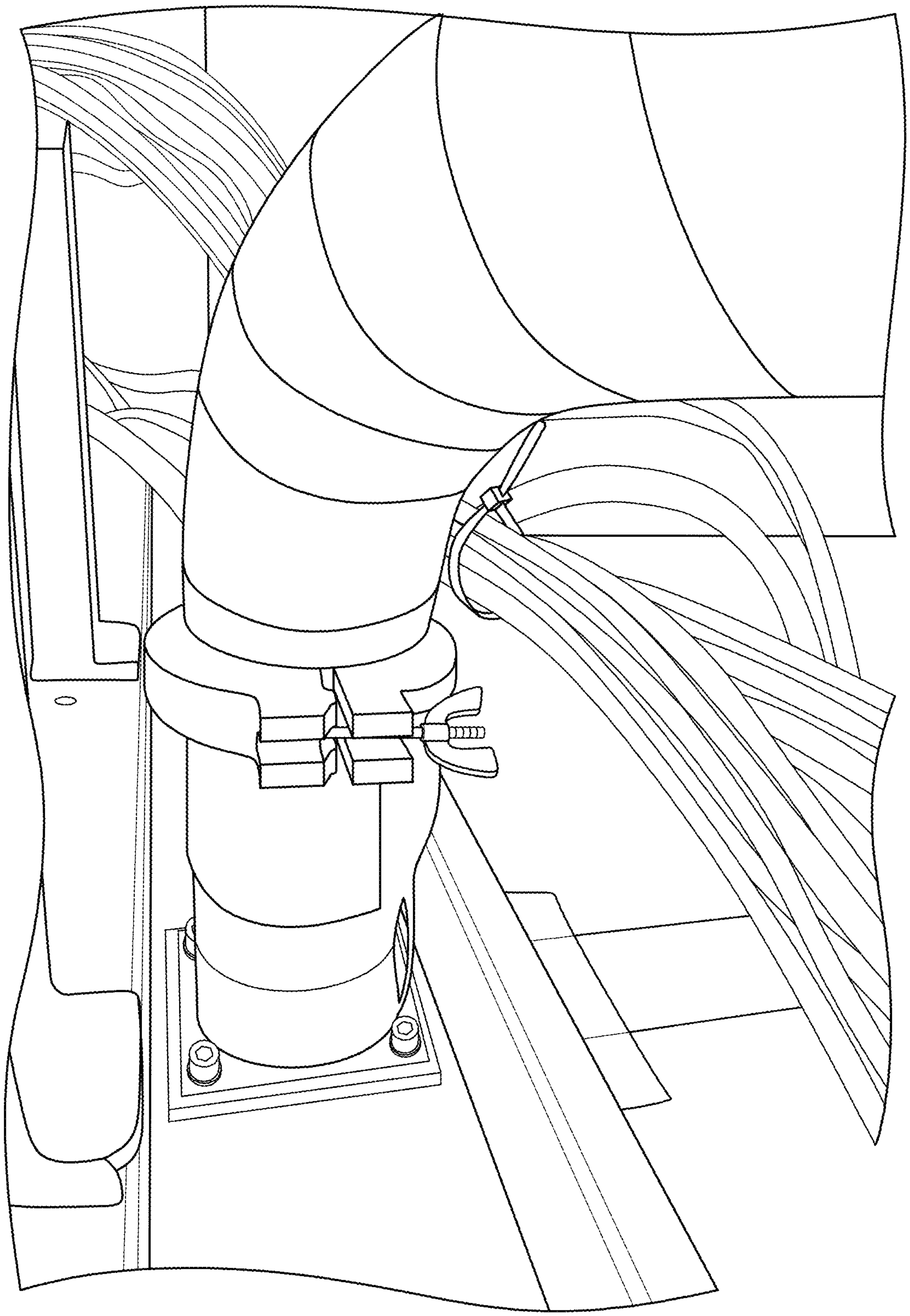
FIG. 16F is a view of an extraction configuration used in the testing of a non-limiting embodiment of the invention.

Effluent laden process gas from the oven was extracted from the process chamber through the horizonal slots of each of the three extraction tubes or branches. The effluent laden gas passed through the extraction tubes into the extraction trunkline. The effluent laden process gas passed along and exited the extraction trunkline through the outlet connection disposed in the back side of the process chamber in heating zone 7. The effluent laden gas passed through and exited the oven through the outlet connection, as shown in FIG. 16D and FIG. 16E, and was passed through flex lines as shown in FIG. 16F for subsequent processing in the effluent management system.

The results of the Extraction Tests #1-6 are shown in Table I below in comparison with the results of the Baseline Extraction Test including extraction ports at the bottom of heating zones 3 and 12 in the Pyramax 150 oven.

TABLE I

| Extraction Test | Baseline | #1 | #2 | #3 | #4 | #5 | #6 |
|---|---|---|---|---|---|---|---|
| Extraction configuration | Bottom Extraction at Zones 3 & 12 | Top Extraction at Zones 5, 6, 7, 10, 11 & 12 | Extraction trunkline to Zone 12 with 10 extraction ports and no branches | Extraction trunkline with 4 branches at Zones 2/3, 5/6, 9/10 & 10/11 | Extraction trunkline with 3 branches at Zones 2/3, 5/6 & 9/10 | Extraction trunkline with 3 extraction ports at Zones 2/3, 5/6 & 9/10 on moveable rail (no branches) | Extraction trunkline with 3 branches at Zones 2/3, 5/6 & 9/10 with outlet port at Zone 7 |
| No. of Plates | 300 | 300 | 300 | 300 | 300 | 300 | 400 |
| Residence Time (hours) | 5 | 5 | 5 | 5 | 5 | 5 | 6 |

TABLE I-continued

| Extraction Test | Baseline | #1 | #2 | #3 | #4 | #5 | #6 |
|---|---|---|---|---|---|---|---|
| Coupon #1 Post-Test Weight (mg) | 12.4 | 2.1 | 12.9 | 41.2 | 15.9 | 13.2 | 14.8 |
| Coupon #2 Post-Test Weight (mg) | 0.0 | 20.1 | 18.8 | 0.0 | 0.0 | 0.0 | 0.0 |
| Coupon #3 Post-Test Weight (mg) | 83.2 | 416.4 | 99.8 | 80.0 | 70.7 | 154.9 | 52.0 |
| White Smoke Density 1-10, where 10 is the maximum and 1 is the minimum | 8 | 10 | 4 | 4 | 1 | 3 | 1 |

A comparison of the Extraction Tests shows that even taking into consideration the greater number of 400 aluminum plates and the greater oven residence time of 6 hours used in Extraction Test #6, Extraction Test #6 resulted in relatively less effluent deposition on the three deposition coupons as compared to Extraction Tests #1-#5. Extraction Test #6 also showed relatively less white smoke emission as compared to Extraction Tests #2-#3 and #5. Only Extraction Test #4 showed a white smoke density rating of 1 similar to Extraction Test #6.

In the present specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The contents of all references, pending patent applications and published patents, cited throughout this application are hereby expressly incorporated by reference as if set forth herein in their entirety, except where terminology is not consistent with the definitions herein. Although specific terms are employed, they are used as in the art unless otherwise indicated.

What is claimed is:

1. A system for withdrawal of a gas laden with an effluent, the system comprising:

at least one tube having a body including an interior passageway enabling fluidic flow therethrough;

a plurality of openings disposed along a length of the body in fluidic communication with the interior passageway, thereby enabling withdrawal of the gas laden with the effluent exterior to the at least one tube through the plurality of openings into the interior passageway of the at least one tube, and at least one trunkline in fluidic communication with the at least one tube via a connection device enabling withdrawal of the gas laden with the effluent from the at least one tube into the at least one trunkline.

2. The system of claim 1, wherein the at least one tube and an at least first portion of the at least one trunkline is disposed within at least one heating zone of a process chamber of a furnace.

3. The system of claim 2, wherein the at least first portion of the at least one trunkline has a length corresponding to a percentage of the length of the process chamber in a range of 20% to 100%.

4. The system of claim 1, wherein the system comprises a material capable of withstanding a temperature above a condensation temperature of the effluent.

5. The system of claim 1, wherein the connection device comprises a reversible coupling for selectively opening and closing fluidic flow from the at least one tube to the at least one trunkline.

6. The system of claim 1, wherein the connection device comprises a reversible coupling for selectively connecting and detaching the at least one tube respectively to and from the at least one trunkline.

7. The system of claim 1, wherein the at least one trunkline comprises at least one valve for controlling an amount of the gas laden with the effluent withdrawn through the connection device into the at least one trunkline.

8. The system of claim 7, wherein the at least one valve is selected from the group consisting of a manual valve, an automated valve, an adjustable valve, a non-adjustable valve, a throttle valve, and a fixed orifice plate.

9. The system of claim 1, wherein a body of the at least one trunkline comprises at least one first segment having a first length having a first inside diameter and at least one second segment having a second length having a second inside diameter; and wherein the first length and the first inside diameter and the second length and the second inside diameter are selected for biasing a flow of the gas laden with the effluent through the at least one trunkline.

10. The system of claim 1, wherein the at least one trunkline comprises a first extraction port fluidically connected to a first at least one tube via the connection device comprising a first connection device;

wherein the at least one trunkline comprises a second extraction port fluidically connected to a second at least one tube via the connection device comprising a second connection device;

wherein the first extraction port has a first internal cross-sectional flow through area and the second extraction port has a second internal cross-sectional flow through area; and wherein the first internal cross-sectional flow through area and the second internal cross-sectional flow through area are selected for biasing the flow of the gas laden with the effluent through the at least one trunkline.

11. The system of claim 1, wherein each of the plurality of openings of the at least one tube has a cross-sectional flow through area selected for providing appropriate resistance for biasing a flow of the gas laden with the effluent through the at least one tube.

12. The system of claim 1, wherein at least one of the plurality of openings of the at least one tube comprises an adjustable device for selectively adjusting a flow of the gas laden with the effluent through the adjustable device for biasing a flow of the gas laden with the effluent through the at least one tube.

13. The system of claim 12, wherein the adjustable device is selected from the group consisting of an adjustable damper and an adjustable shutter.

14. The system of claim 1, wherein the at least one tube has a tube port for mating with an at least one extraction port disposed on the at least one trunkline via the connection device thereby enabling fluidic flow from the at least one tube into the at least one trunkline; and wherein the tube port is disposed in a location on the body of the at least one tube for biasing a flow of the gas laden with the effluent through the at least one tube.

15. The system of claim 1, wherein the at least one tube comprises a material capable of withstanding a temperature in a range of 20° C. to 400° C.; and wherein the material selected from the group consisting of aluminum, steel, stainless steel, Inconel®, austenitic nickel-chromium-based superalloy, high-temperature rated plastic, and a combination of two or more of the aforementioned.

16. The system of claim 1, wherein the at least one trunkline comprises a material capable of withstanding a temperature in a range of 20° C. to 400° C.; and wherein the material is selected from the group consisting of aluminum, steel, stainless steel, Inconel®, austenitic nickel-chromium-based superalloy, high-temperature rated plastic, and a combination of two or more of the aforementioned.

17. The system of claim 1, wherein the at least one tube is disposed within a process chamber of a furnace; and wherein the at least one tube has a length corresponding to a percentage of a width of the process chamber in a range of 5% to 100%.

18. The system of claim 1, wherein the at least one tube has a sealed end.

19. A method of withdrawing a gas laden with an effluent from a process chamber of a furnace comprising:

providing in one or more heating zones in the process chamber of the furnace at least one tube having a plurality of openings;

conveying a product into and through the one or more heating zones in the process chamber of the furnace;

heating the product in the one or more heating zones thereby vaporizing an effluent into the gas of the process chamber;

withdrawing the gas laden with the effluent through the plurality of openings into the at least one tube;

withdrawing the gas laden with the effluent from the at least one tube into an at least one trunkline fluidically connected to the at least one tube; and passing the gas through the at least one trunkline through an exit of the furnace.

* * * * *